INVENTOR
DURA W. SWEENEY
BY Thomas & Crickenberger
ATTORNEYS

Aug. 18, 1964 D. W. SWEENEY 3,145,296

DIVIDER DEVICE FOR SKIPPING A STRING OF ZEROS OR RADIX-MINUS-ONE DIGITS

Filed April 19, 1961

29 Sheets-Sheet 3

Aug. 18, 1964 D. W. SWEENEY 3,145,296

DIVIDER DEVICE FOR SKIPPING A STRING OF ZEROS OR RADIX-MINUS-ONE DIGITS

Filed April 19, 1961 29 Sheets-Sheet 8

Aug. 18, 1964

D. W. SWEENEY 3,145,296

DIVIDER DEVICE FOR SKIPPING A STRING OF ZEROS OR RADIX-MINUS-ONE DIGITS

Filed April 19, 1961

29 Sheets-Sheet 9

Aug. 18, 1964 D. W. SWEENEY 3,145,296

DIVIDER DEVICE FOR SKIPPING A STRING OF ZEROS OR RADIX-MINUS-ONE DIGITS

Filed April 19, 1961 29 Sheets-Sheet 11

Aug. 18, 1964 D. W. SWEENEY 3,145,296

DIVIDER DEVICE FOR SKIPPING A STRING OF ZEROS OR RADIX-MINUS-ONE DIGITS

Filed April 19, 1961 29 Sheets-Sheet 12

Aug. 18, 1964 D. W. SWEENEY 3,145,296

DIVIDER DEVICE FOR SKIPPING A STRING OF ZEROS OR RADIX-MINUS-ONE DIGITS

Filed April 19, 1961 29 Sheets-Sheet 13

Aug. 18, 1964

D. W. SWEENEY 3,145,296

DIVIDER DEVICE FOR SKIPPING A STRING OF ZEROS OR RADIX-MINUS-ONE DIGITS

Filed April 19, 1961

29 Sheets-Sheet 14

Aug. 18, 1964

D. W. SWEENEY 3,145,296

DIVIDER DEVICE FOR SKIPPING A STRING OF ZEROS OR RADIX-MINUS-ONE DIGITS

Filed April 19, 1961

29 Sheets-Sheet 19

Aug. 18, 1964

D. W. SWEENEY

DIVIDER DEVICE FOR SKIPPING A STRING OF ZEROS OR RADIX-MINUS-ONE DIGITS 3,145,296

Filed April 19, 1961

29 Sheets-Sheet 21

Aug. 18, 1964 D. W. SWEENEY 3,145,296

DIVIDER DEVICE FOR SKIPPING A STRING OF ZEROS OR RADIX-MINUS-ONE DIGITS

Filed April 19, 1961 29 Sheets-Sheet 25

Aug. 18, 1964 D. W. SWEENEY 3,145,296

DIVIDER DEVICE FOR SKIPPING A STRING OF ZEROS OR RADIX-MINUS-ONE DIGITS

Filed April 19, 1961 29 Sheets-Sheet 29

United States Patent Office 3,145,296
Patented Aug. 18, 1964

3,145,296

DIVIDER DEVICE FOR SKIPPING A STRING OF ZEROS OR RADIX-MINUS-ONE DIGITS

Dura W. Sweeney, Salt Point, N.Y., assignor to International Business Machines Corporation, New York, N.Y., a corporation of New York Filed Apr. 19, 1961, Ser. No. 104,052
15 Claims. (Cl. 235—164)

This invention relates to arithmetic devices and more particularly to an arithmetic device for performing division.

It has been customary in earlier types of arithmetic devices for performing divide operations to do so by generating one quotient bit for each add operation performed. This procedure was followed in division both for the restoring and non-restoring methods.

To generate a quotient having many bits involves a considerable amount of time where an add operation must be performed for each quotient bit generated. In order to reduce the time required to generate a quotient having many bits, there is provided according to this invention a divider which may generate a plurality of quotient bits for each add operation performed.

A partial dividend may contain one or more leading zeros or one or more leading digits each equal to the radix minus one. An improved divider is provided according to the invention which recognizes the appropriate number of these leading zeros or radix-minus-one digits and eliminates them from the partial dividend and simultaneously introduces them into the quotient.

If the radix is binary, an improved divider is provided according to this invention which skips over a string of ones or a string of zeros in the partial dividends and generates the proper quotient bits simultaneously. When skipping over ones in a string, ones are inserted in the quotient for each one skipped in the dividend except the last one in the string, and as soon as the next add operation of the dividend and the divisor takes place, the proper quotient bit is generated for the last one in the string of ones in the remainder. When skipping over a string of zeros in the dividend, zeros are inserted in the quotient for each zero skipped except the last one, and as soon as the next add operation of the dividend and the divisor takes place, the proper quotient bit for the last zero is generated.

The validity of this method may be readily demonstrated since each iteration of division must satisfy:

$$\text{(partial dividend)} - \text{(partial quotient)} \times \text{(divisor)} = \text{(partial remainder)} \quad (1)$$

At the next iteration after a suitable shift, the partial remainder becomes the new partial dividend and a new partial quotient and partial remainder are generated. This process is repeated until a suffiicent number of partial quotients have been generated and assembled to produce the proper final quotient length. If in (1) we substitute:

$$\text{(partial dividend)} = a + b.r^{-k} \quad (2)$$

$$\text{(divisor)} = a + c.r^{-k}$$

$$\text{(partial quotient)} = 1.0$$

where ($a$) are the leading non-zero digits of the dividend and divisor which are equal, ($b$) and ($c$) are the remaining digits of the dividend and divisor, ($r$) is the radix, and ($k$) is equal to the number of digits in ($a$). Then we have:

$$(a+b.r^{-k}) - 1.0(a+c.r^{-k}) = \text{(partial remainder)} \quad (3)$$

$$a+b.r^{-k} - a - c.r^{-k} = \text{(partial remainder)}$$

$$(a-a) + (b-c)r^{-k} = \text{(partial remainder)}$$

$$(b-c)r^{-k} = \text{(partial remainder)}$$

Note that in (3) at least $k$ leading zeros are now present in the partial remainder. These zeros may be skipped and inserted in the quotient since no new quotient digit except zero can be possible until the partial remainder is shifted so as to make it larger than the divisor.

If $b>c$ then the trial quotient of 1.0 was chosen too small and the next partial quotient will be added to this 1.0 offset at least "$k$" places to the right. This generates a one followed by at least $k-1$ zeros as the partial quotient. If $b<c$ then the trial quotient of 1.0 was chosen too large and the next partial quotient will be subtracted from this 1.0 offset at least $k$ places to the right. This generates a zero followed by at least "$k-1$" radix-minus-one digits as the partial quotient. More than "$k$" digits may be developed if $b$ is nearly equal to $c$.

For the purpose of discussing a divider according to this invention it is assumed that prior to the start of an actual division the divisor is so positioned in the divisor register that it has a one in the highest order position of the register. It also is assumed that the divisor and the dividend are binary fractions with the binary point located just to the left of the high order position. Thus, the divisor always has a numerical value less than one but equal to or greater than one-half. These assumptions do not limit the application of the principles of operation, but they do simplify the description. It is assumed further that a shift counter of some type is included, that this counter is set initially with the number of quotient bits to be developed, and that any shift-determining circuits include provision for comparing the shift called for against the number of shifts still available as indicated by the shift counter and then acting on this information according to the rules developed subsequently. Throughout the description the term dividend is used to mean both the initial dividend and the material dividends, while the term remainder refers to the final remainder after the quotient is completely developed. The term addition refers to the adding of the dividend and the divisor, one of which is positive and the other negative, thereby effectively performing a subtraction.

All operations start by setting the dividend into the dividend-quotient register, the divisor into the divisor register, and a number equal to the quotient length into the shift counter. The divider arrangement according to this invention may perform floating point or fixed point division. However, fixed point division is arbitrarily assumed for purposes of illustration, and it is also assumed that the dividend and the divisor previously have been normalized. The exponent, if any, is presumed to be taken care of elsewhere, and it is not discussed herein. The shift counter is assumed to count down. The high order bit position of the dividend and the high order bit position of the divisor enter the same column of the adder unless stated otherwise. Shifting of the dividend is to the left, and this clears the right end of the dividend register as the divide operation proceeds. The quotient is developed at the right end of the dividend register and shifted along with the dividend. A dividend decoder is assumed to be on the high order end of the adder output, and accordingly the initial operation always starts with a forced zero shift, following which the decoder take control of the shifting.

With the foregoing arrangement of an arithmetic device in mind, it is convenient to examine some of the rules for perfecting the logic set out and illustrated in Equations 1 through 3 above. First, assume that a dividend is in true form or positive, not complement or negative. Since the high order bit of the divisor is required to be a one, if the high order bit of the dividend is a zero, the divisor is obviously larger than the dividend which will result in a zero quotient bit. A zero therefore may be placed in the quotient, and the dividend and quotient each shifted left one position before any addition is performed. If there are $n$ leading zeros, and the decoder can recognize them, $n$ positions may be shifted across in one operation, a zero being inserted in the quotient for each position shifted.

With the dividend true and the high order bit a one, an addition must be performed to determine whether or not the dividend is larger than the divisor since by earlier assumptions made the divisor always has a one in the higher order bit. If the result of the addition operation is true, the dividend was larger, and a one is entered in the quotient. If the result is complement or negative, the dividend was smaller than the divisor, and a zero is entered in the quotient. In either case, the result of the addition replaces that part of the previous dividend in the dividend register that was used in the addition. If the result of the addition is a complement number, this makes the entire new dividend a complement number even though part of it did not go through the adder.

Shifting the dividend one position left is equivalent to dividing the divisor by two with respect to the original dividend. For a true dividend with a high order one, if one times the divisor results in a zero in that position of the quotient (divisor being larger than the dividend), then one-half of the divisor (next shift position) always results in a one in the following bit position of the quotient. That is, the high order bit of the dividend being a binary one in a number represented by a fraction makes the dividend equal to or greater than one-half, while the divisor must be less than one-half in this case. If, after the first addition, the dividend had been returned to its original value, then, using the first addition as a point of reference, the second addition would have given a true result with a value equal to the original dividend minus one-half of the divisor, thereby indicating a one in the quotient bit for the second addition. If, instead of returning to the true original dividend, shifting, and adding the divisor in complement form, the complement result of the previous addition had been retained, shifted and a true value of the divisor added to it, the result would have been the original dividend minus the divisor plus one-half of the dividend. This also would be a true final result having the same value as that obtained by the previous method.

Assume that a partial division has been performed yielding a partial quotient of 01111 and a corresponding partial dividend. This result could have been obtained by any of the series of operations set out in Table 1 below:

*Table 1*

Dividend $(-\frac{1}{2}-\frac{1}{4}-\frac{1}{8}-\frac{1}{16})$ Divisor
Dividend $(-1.0+\frac{1}{2}-\frac{1}{4}-\frac{1}{8}-\frac{1}{16})$ Divisor
Dividend $(-1.0+\frac{1}{4}-\frac{1}{8}-\frac{1}{16})$ Divisor
Dividend $(-1.0+\frac{1}{8}-\frac{1}{16})$ Divisor
Dividend $(-1.0+\frac{1}{16})$ Divisor Each of the series of operations set out in Table 1 above is equal to the dividend minus $\frac{15}{16}$ divisor. From this it may be stated that if a complement result is obtained under the condition that it is known that the next succeeding quotient bit is a one, then as many positions of the dividend may be shifted across as it is known will still result in a true dividend following the addition, a one being entered in the quotient for each position shifted across.

Since the high order position of the divisor, in its true form, always contains a one, a true result will always be obtained if the high order bit position of the complement dividend contains a one. This justifies shifting across all except the last one in a string of high order ones in a complement dividend and entering a one in the quotient for each position shifted across. It is also known that if an addition is performed without shifting across the final one, a true dividend always will be obtained with a one being entered in the quotient. If the complement result had been shifted one position farther, the new dividend obtained would be the same following the addition of the true divisor as would have been obtained following a one position shift of the true dividend and the addition of the complement of the divisor. Thus it is evident that with either true or complement dividends it is necessary to perform an addition only when it is not evident what the quotient bit should be. Accordingly, the following operating rules may be stated.

(1) When the dividend is true, shift across any leading zeros, and enter a zero in the low order end of the quotient for each position shifted across except the last; then add the complement of the divisor.

(*a*) If the result is true, enter a one in the low order position of the quotient, then shift across zeros.

(*b*) If the result is complement, enter a zero in the low order position of the quotient, then shift across ones.

(2) When the dividend is in complement form, shift across any leading ones, and enter a one in the lower order end of the quotient for each position shifted across except the last; then add the true divisor.

(*a*) If the result is true, enter a one in the low order position of the quotient, then shift across zeros.

(*b*) If the result is complement, enter a zero in the low order position of the quotient, then shift across ones.

(3) It is not possible to get a true dividend with a string of leading ones or a negative dividend with a string of leading zeros under the assumed conditions of a one in the highest order bit of the true divisor, the sign of the dividend and the divisor being unlike, and the sign of the dividend and the divisor being represented in a bit adjacent to the highest order bit thereof by a zero for a plus sign and a one for a minus sign.

If the decoder calls for a larger shift than can be obtained from the shifter in one shift operation, use the maximum shift available and suppress both the true and complement entry of the divisor to the adder. This will pass the high order part of the shifted dividend through the adder with zero added to it so that it is available to the decoder. If the dividend is complement, the output of the adder following this will be complement, which normally would result in the setting of a zero in the low order position of the quotient. However, this is in the middle of a shift across ones, not an addition to determine the proper quotient bit following a shift, and the dividend goes through the adder only because of the necessity of making it available to the decoder. Therefore, in this case, the low order bit of the quotient following the shift must be set to agree with the bits being shifted across, and the same control which suppresses the entry of the divisor into the adder may be employed to control entry of the proper bits into the low order bits of the quotient.

Several rules may be stated for terminating the divide operation and insuring that the final remainder is in true form. They are listed below.

(1) If the dividend is in true form and the shift called for by the decoder is larger than that allowed by the shift counter, treat this in the same manner as when the shift called for is greater than the capacity of the shifter. Make the shift allowed by the shift counter, suppress the entry of the divisor into the adder, set each low order bit of the quotient to agree with the bits being across. This will complete the division operation.

(2) When the dividend is in true form and the shift called for by the decoder is equal to that allowed by the shift counter, treat this in the normal manner. If the resulting adder output is in true form, the division is complete with its entry into the dividend register. If the resulting adder output is in complement form, one more cycle is required to get the remainder into true form.

This may be accomplished as indicated in paragraph 4 below.

(3) If the dividend is in complement form and the shift called for by the decoder is equal to or greater than that allowed by the shift counter register, use the allowed shift and proceed in the normal manner. If the resulting remainder is in true form, the division is complete. If the resulting remainder is in complement form, the resulting quotient is complete, but one further cycle is required to get the remainder into true form. This may be accomplished as indicated in paragraph 4 below. The latter condition can occur only when the shift called for and the shift counter register are equal.

(4) If the dividend is in complement form and the shift counter register is zero, perform a shift of zero, add the true value of the divisor and suppress entry from the adder output into the low order bit position of the quotient as the bit already there is correctly a zero and the true output of the adder would change it to a one.

If the following binary division problem is performed according to the foregoing rules, it will require fourteen add cycles to complete the problem.

$$\begin{array}{r} 011,100,011,011,001,001,010,110 \\ 110,110\,\overline{)10,111,111,110,111,001,111,000,100,100} \end{array}$$

If a random distribution of divisor bits between problems and dividend bits between and within problems is assumed, the average shift per add cycle is $$651/256=2.54$$

for a five bit divisor using a shifter capable of handling shifts of five or less. It can be shown that the distribution of bits within a dividend does not remain completely random as the division progresses. However, the variations will not be sufficiently great to invalidate the results based on the assumption of complete randomness. As may be observed by the illustration in Equation 3 above, the string of ones or zeros is lengthened for a given add cycle as the value of the dividend and the value of the divisor approach the condition of being equal. Note that when the dividend and the divisor are exactly equal, "$a$" reaches its maximum value, and "$k$" reaches its greatest value. In this instance, however, "$b$" and "$c$" are zero, and the value of "$k$" is not significant because the second expression in Equation 3 above becomes zero, thereby yielding a quotient of one.

Accordingly, there is provided according to this invention a divider which provides a quotient in a minimum period of time by reducing the number of add cycles.

It is a feature of this invention to perform a division problem by skipping a series of ones or a series of zeros in the dividend and inserting the proper quotient of one or zero for each respective one or zero skipped in a series.

The foregoing and other objects, features and advantages of the invention will be apparent from the following more particular description of a preferred embodiment of the invention, as illustrated in the accompanying drawings.

Figure 1:
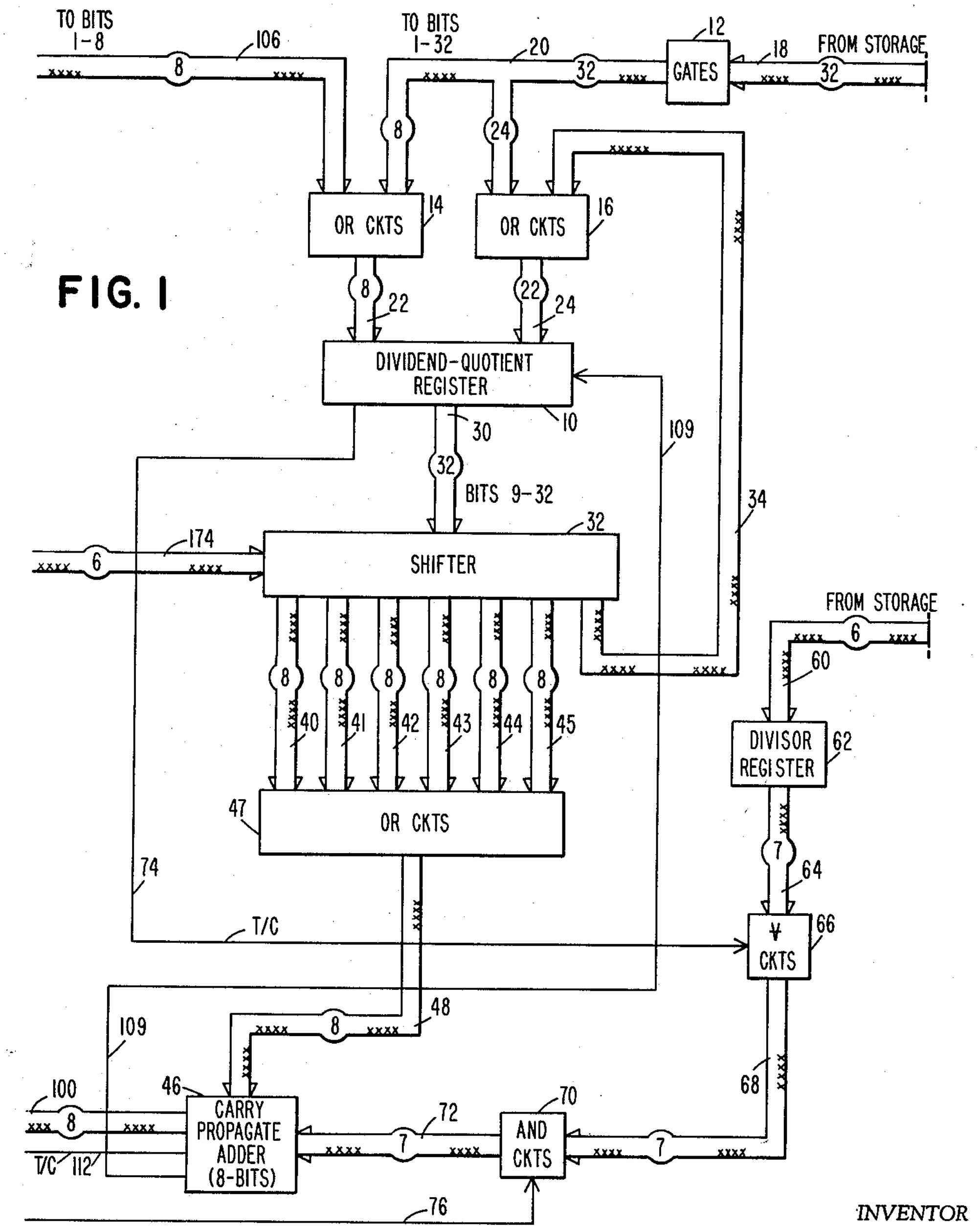
FIGURES 1 and 2 illustrate in block form a divider arrangement according to this invention.

A divider arrangement according to this invention may employ varying numbers of bits in the dividend and a varying number of bits in the divisor. A dividend of 29 bits and a divisor of 6 bits are arbitrarily selected for purposes of illustration. The benefits of a divider according to the present invention are more noteworthy as the dividend becomes very great in length, say 48 bits in length for instance. Positive logic is employed throughout the circuits of this invention unless indicated otherwise. D.C. levels are employed to operate the logic circuits illustrated, and in some instances the circuits are operated by pulses. Signal levels representing binary information are positive when representing binary one and negative when representing binary zero. Levels are referred to hereinafter as positive and negative levels, but this designation is arbitrarily used since in many instances two positive levels, one being more positive than the other, or two negative levels, one being more negative than the other, may be suitably employed in various types of logic circuits. Throughout the figures of the drawing, arrowheads indicate the direction of information flow or the direction of control for D.C. or pulse signals, and signals going to a circuit may be connected to any portion of the block representation of the circuit. Numerals disposed within circular portions of the cables indicate the number of conductors in the cable.

Figures 2, 31:
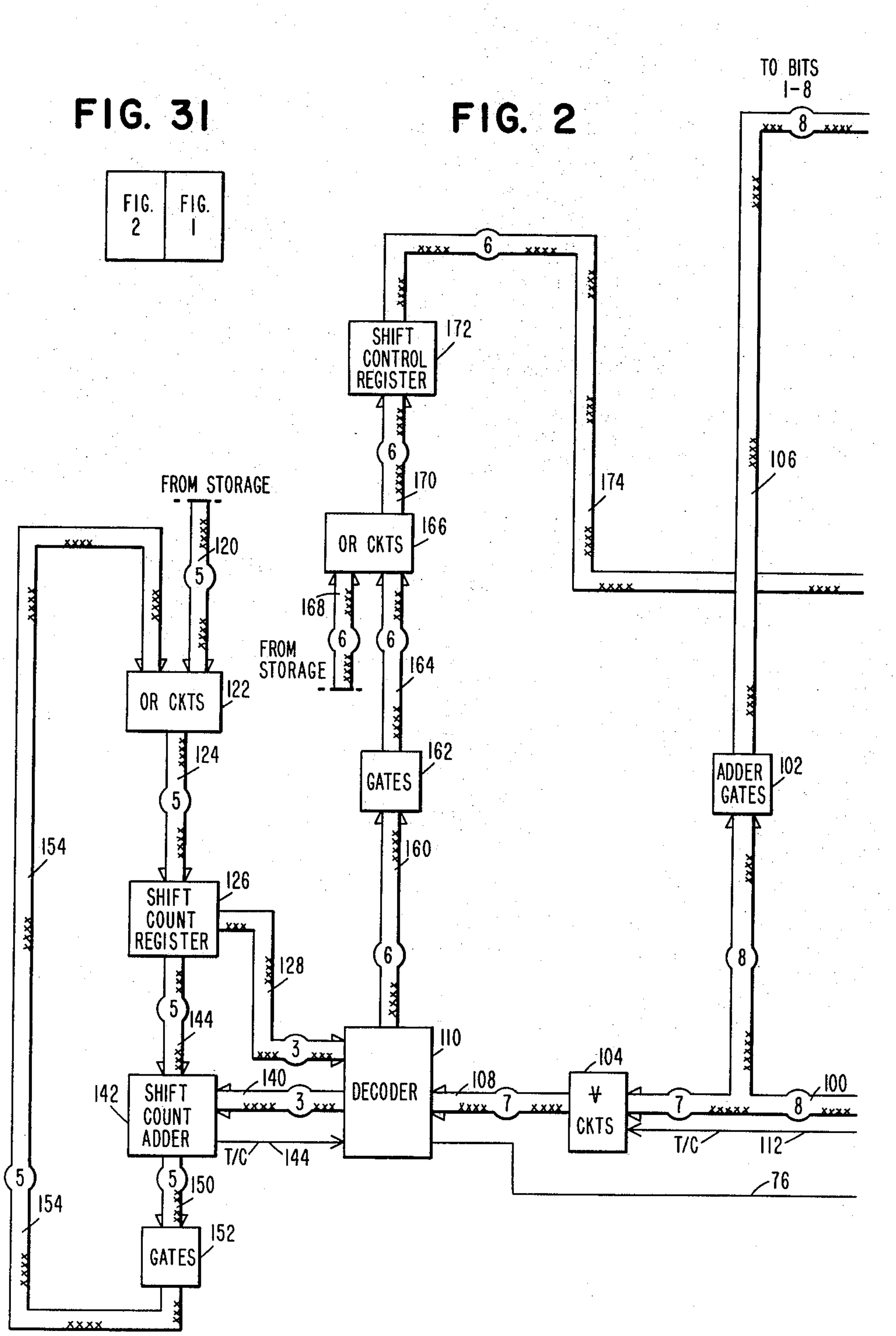
FIGURE 31 illustrates how FIGURES 1 and 2 should be arranged with respect to one another.

A block diagram of a divider according to this invention is illustrated in FIGURES 1 and 2 which should be arranged with respect to one another as indicated in FIGURE 31. Referring first to FIGURE 1, a dividend-quotient register 10 is provided which receives information from a storage device not shown through a set of gates 12 and OR circuits 14 and 16. Information is supplied to the gates 12 on conductors of a cable 18, and information from the gates 12 to the OR circuits 14 and 16 is supplied on the conductors of a cable 20. Information from OR circuits 14 to the dividend-quotient register 10 is supplied on the conductors of a cable 22, and information from the OR circuits 16 to the dividend-quotient register 10 is supplied on the conductors of a cable 24. The dividend-quotient register 10 initially holds the dividend, and as the divide problem progresses the contents of the dividend-quotient register 10 is shifted to the left with quotient bits being inserted in the right hand portion of this register. The dividend-quotient register 10 is hereafter referred to by the short title of dividend register.

Information from the dividend register 10 is supplied on the conductors of a cable 30 to a shifter 32, and information from the shifter is supplied along the conductors of a cable 34, through the OR circuits 16 to the dividend register 10. Information supplied along the conductors of the cable 34 may be shifted five positions to the left in the dividend register, or the information may be shifted any number of positions less than five. The number of conductors in the cable 34 is not indicated in FIGURE 1, but they are illustrated in greater detail subsequently.

The shifter 32 has a group of cables 40 through 45 which are connected to a carry propagate adder 46 through OR circuits 47 and a cable 48. One of the cables 40 through 45 is selected as respective shifts of zero through six are performed by the shifter 32 when skipping over a string of ones or zeros in the dividend. It is pointed out that regardless of the number of shifts involved, eight bits are always supplied through the OR circuits 47 and along the conductors of the cable 48 to the carry propagate adder 46. For example, during the first add cycle when a shift of zero is called for, signals are supplied along the conductors of the cable 40, and during the second or any subsequent add operation if a shift of five is called for, signals are supplied along the conductors of the cable 45 in route to the carry propagate adder 46. The bits in the dividend register which constitute a string of zeros or ones are skipped by the shifter 32, and they are not supplied along the conductors of any of the cables 40 through 45 to the carry propagate adder 46.

Information from a storage device not shown is supplied along the conductors of a cable 60 to a divisor register 62, and information from the divisor register 62 is supplied along the conductors of a cable 64 to a set of exclusive OR circuits 66. Information from the exclusive OR circuits 66 is supplied along the conductors of a cable 68, through a set of AND circuits 70 and along the conductors of a cable 72 to the carry propagate adder 46. The exclusive OR circuits 66 are controlled by signals on a line 74 to provide the true or complement form of the divisor to the carry propagate adder 46. If the dividend supplied to the carry propagate adder 46 is in true form, the line 74 operates the exclusive OR circuits 66 to provide the complement of the divisor to the carry propagate adder 46. If the dividend supplied to the carry propagate adder 46 is in complement form, the signals on the line 74 operate the exclusive OR circuits 66 to provide the true form of the divisor to the carry propagate adder. The set of AND circuits 70 are operated by signals on the line 76 to permit or inhibit entry of the divisor to the carry propagate adder 46. The AND circuits 70 are conditioned to pass the divisor to the carry propagate adder 46 at all times during a divide operation except when a shift of greater than five is being performed or a termination operation is being performed.

Signals from the carry propagate adder 46 in FIGURE 1 are conveyed along output conductors of a cable 100 to a set of adder gates 102 and a set of exclusive OR circuits 104 in FIGURE 2. Information from the adder gates 102 is supplied along output conductors of a cable 106 to the OR circuits 14 in FIGURE 1, and this information is conveyed along the conductors of a cable 22 and stored in bit positions 1 through 8 of the dividend register 10. Information passed by the exclusive OR circuits 104 is conveyed along the conductors of a cable 108 to a decoder 110. Signals on a line 109 signify the proper quotient bit for the lowest order of the quotient, and this line always signifies a zero unless there is an overflow from the adder 46. The exclusive OR circuits 104 are controlled by signals on a line 112 whereby the result of the addition in the carry propagate adder 46 is supplied in true or complement form to the decoder 110. The signals on the line 112 represent the true or complement condition of the adder result. The decoder 110 determines the number of leading zeros when the result from the carry propagate adder 46 is in true form, it determines the number of leading ones when the result from the carry propagate adder 46 is in complement form. Accordingly, signals on the line 112 to the exclusive OR circuits 104 pass the true result of the carry propagate adder 46 directly to the decoder 110, and they invert the result of the carry propagate adder 46 when its output is in complement form. Thus, by this technique the same set of circuits in the decoder which determines the number of leading zeros in a true result from the adder 46 may also be used to determine the number of leading ones in the result of the carry propagate adder 46 when it is in complement form. With one set of decoding circuits the decoder is thereby able to indicate the number of shifts which will be required for the next add operation whether zeros or ones are involved.

Preliminary to commencing a divide problem, information from storage is supplied along the conductors of a cable 120 to OR circuits 122 and along the conductors of a cable 124 to a shift count register 126. The number thus stored in this shift count register 126 represents the number of quotient bits which are to be generated for a given divide problem. This number represents the number of shifts available for shifting the dividend, and it is supplied to the decoder 110 along the conductors of a cable 128. If the number of shifts available are equal to or greater than the number of shifts which the decoder requires for the next add operation, then the decoder is permitted to take the number of shifts needed. The number of shifts actually taken by the decoder is represented by signals along the conductors of a cable 140, and they are supplied to a shift count adder 142. The line 144 is energized with signal representing the true or complement condition of the shift count adder result, and it prevents the decoder 110 from taking more shifts than are available in the shift count register. The number of shifts available as represented in the shift count register 126 is supplied in true form as signals along the conductors of a cable 144 to the shift count adder 142. The number of shifts actually taken in a given add operation by the decoder 110 is supplied in complement form as signals along the conductors of the cable 140 to the shift count adder 142. The result from the shift count adder 142 is supplied along the conductors of a cable 150, through a set of gates 152, along the conductors of a cable 154, through the OR circuits 122 and along the conductors of the cable 124 to the shift count register 126 where the information is stored. The output of the shift count adder 142 represents the difference between the number of shifts available, as represented in the shift count register 126 and supplied on the conductors of the cable 144 to the shift count adder 142, and the number of shifts actually taken by the decoder 110 which is represented by signals on the conductors of the cable 140 to the shift count adder 142.

The shifts actually taken for a given add operation by the decoder 110 is represented by signals along the conductors of a cable 160, and this cable is connected to a set of gates 162 which in turn is connected by a cable 164 to OR circuits 166. Signals from a storage device not shown are supplied along the conductors of a cable 168 to the OR circuit 166 preliminary to commencing a divide problem, and these signals are supplied along the conductors of a cable 170 to operate a shift control register 172 and make it select a shift of zero for the first add operation. For the second and each subsequent add operation the shift control register 172 is operated by signals from the decoder 110 which pass through the gates 162 and the OR circuits 166 to the shift control register 172. The shift control register 172 supplies signals along the conductors of a cable 174 to the shifter 32 in FIGURE 1. There are six conductors in the cable 174 one of which is always positive and the remaining ones negative. During the first add operation of a divide problem a shift of zero is selected, and during the second and all subsequent add operations a shift of one or more always is selected.

One circuit arrangement for the divider illustrated in block form in FIGURES 1 and 2 is shown in detail in FIGURES 3 through 25. FIGURES 3 through 7 show the dividend register 10 as composed of thirty-two stages with each stage having a latch register circuit shown in block form. The latch register circuit of each stage is identified by the number of the stage disposed within the block. The OR circuit 14 in FIGURE 1 is shown in detail in FIGURE 3 as having individual OR circuits 251 through 259 which are connected to respective latch register circuits 1 through 9 of the latch register 10. The OR circuit 16 in FIGURE 1 is shown in detail in FIGURES 4 through 7 as having individual OR circuits 260 through 282 connected to respective latch register circuits 10 through 32 of the latch register 10.

Figure 3:
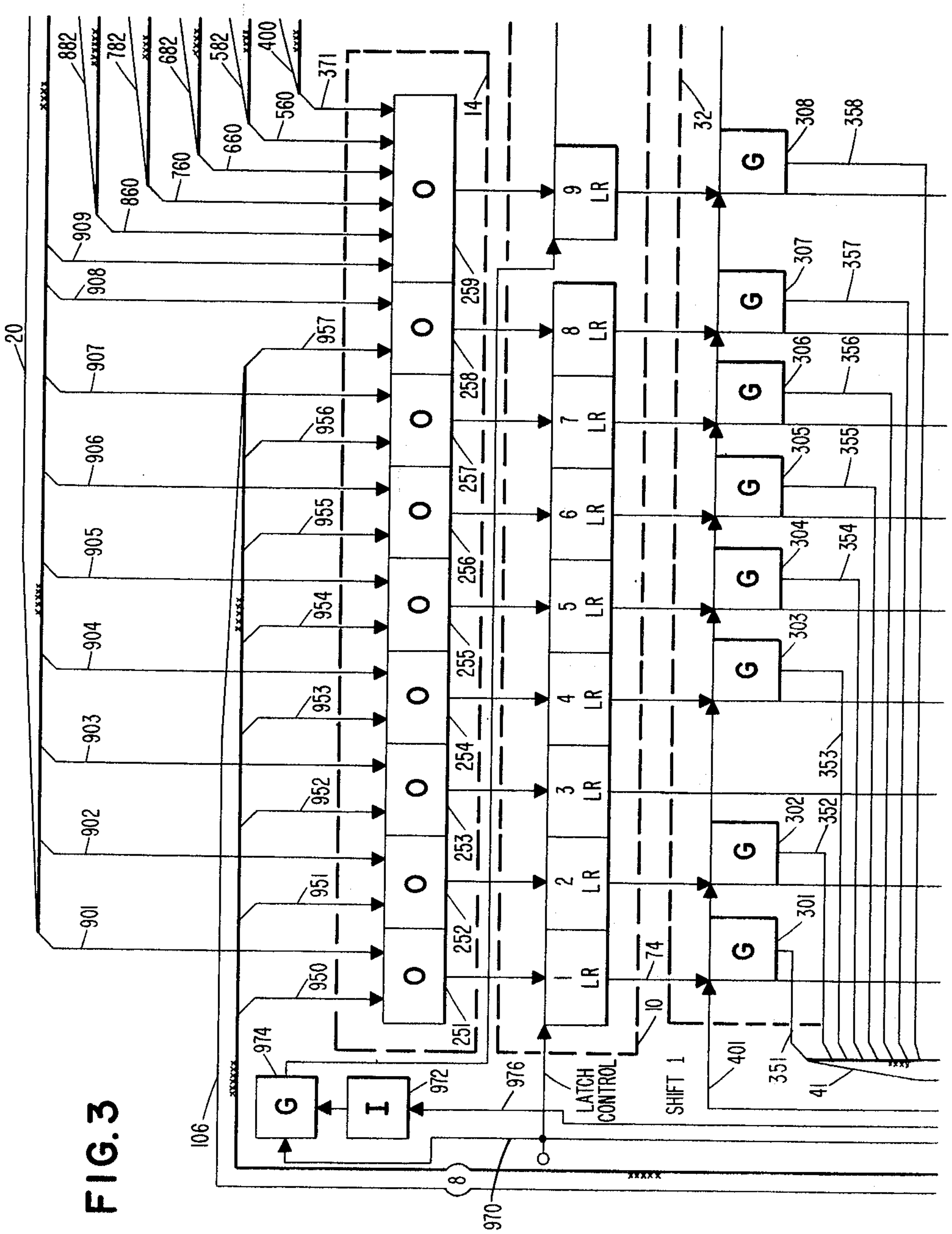
FIGURES 3 through 25 illustrate in detail the logic circuits for the divider arrangement shown in FIGURES 1 and 2.

The output lines of the latch registers 1 through 32 are connected to a set of gates 301 through 331 with the exception that the output of the latch register circuit of stage 3 is not connected to a gate. The gates 301 through 308 are transfer gates having respective output conductors 351 through 358 which are conveyed through a cable 41 that passes from FIGURE 3 through FIGURES 8, 13, 19 and 18 to the OR circuits 47 in FIGURES 18 and 19. The conductors 351 through 358 are connected to respective OR circuits 361 through 368 in FIGURES 18 and 19. The OR circuits 361 through 368 have output lines which are connected as shown to associated adder stages of the adder 46 in FIGURES 20 and 21. The gates 309 through 331 in FIGURES 4 through 7 are shift gates having respective output lines 371 through 393 which constitute the conductors of a cable 400, and the conductors 371 through 393 are connected to respective OR circuits 259 through 281 of the dividend register 10 in FIGURES 4 through 7. This involves a shift of one position to the left. The gates 301 through 331 are conditioned to pass positive signals from associated stages 1 through 32 of the latch register 10 whenever a line 401 is energized with a positive signal. Information from the gates 301 through 308 in FIGURE 3 is transferred to the adder 46 in FIGURES 20 and 21; whereas, information from the gates 309 through 331 is conveyed back to the inputs of the dividend register 10 in FIGURES 3 through 7 displaced one position to the left. Thus it is seen that the gates 309 through 331 serve as shift gates to effect a shift of one position to the left, and the gates 301 through 308 are employed as transfer gates to convey information in stages 1, 2 and 4 through 9 of the dividend register 10 in FIGURE 3 to the adder 46 in FIGURES 20 and 21. Lines 402 and 403 in FIGURES 8 through 12 and lines 404 and 405 in FIGURES 13 through 17 operate associated gates in those figures to perform similar functions wherever shifts of two, three, four or five positions, respectively, are involved.

Whenever the line 402 in FIGURES 8 through 12 is energized with a positive signal, gates 501 through 531 are operated, and information from respective stages 2 through 32 of the dividend register 10 in FIGURES 3 through 7 pass through these gates to respective output lines 551 through 581 with the exception that stage 3 has no gate associated therewith. The output lines 551, 552 and 554 through 559 pass through the cable 42 in FIGURES 8, 13, 19 and 18 to the respective OR circuits 361 through 368 in FIGURES 18 and 19. The output lines 560 through 581 in FIGURES 9 through 12 pass through a cable 582 to respective OR circuits 259 through 280 in FIGURES 3 through 6. The gates 501, 502 and 504 through 509 are transfer gates which pass information from respective stages 1, 2 and 5 through 10 of the dividend register 10 in FIGURES 3 and 4 to the adder 46 in FIGURES 20 and 21. The gates 510 through 531 in FIGURES 9 through 12 are shift gates which supply information to the inputs of the dividend register 10 in FIGURES 3 through 7 displaced two positions to the left.

When the line 403 in FIGURES 8 through 12 is energized with a positive signal, gates 601 through 630 are operated, and information from respective stages 1 through 32 of the dividend register 10 in FIGURES 3 through 7 pass through these gates to respective output lines 651 through 680 with the exception that stages 3 and 4 of the dividend register 10 have no gates associated therewith. The output lines 651, 652 and 654 through 659 pass through the cable 43 in FIGURES 8, 13, 19 and 18 to the respective OR circuits 361 through 368 in FIGURES 18 and 19. The output lines 660 through 680 in FIGURES 9 through 12 pass through a cable 682 to respective OR circuits 259 through 279 in FIGURES 3 through 6. The gates 601, 602 and 604 through 609 are transfer gates which pass information from respective stages 1, 2 and 6 through 11 of the dividend register 10 in FIGURES 3 and 4 to the adder 46 in FIGURES 20 and 21. The gates 610 through 630 in FIGURES 9 through 12 are shift gates which supply information to the inputs of the dividend register 10 in FIGURES 3 through 6 displaced three positions to the left.

Whenever the line 404 in FIGURES 13 through 17 is energized with a positive signal, gates 701 through 729 are operated and information from respective stages 1 through 32 of the dividend register 10 in FIGURES 3 through 7 pass through these gates to respective output lines 751 through 779 with the exception that stages 3 through 5 have no gates associated therewith. The output lines 751, 752 and 754 through 759 pass through the cable 44 in FIGURES 13, 19 and 18 to the respective OR circuits 361 through 368 in FIGURES 18 and 19. The output lines 760 through 779 in FIGURES 14 through 17 pass through a cable 782 to respective OR circuits 259 through 278 in FIGURES 3 through 6. The gates 701, 702 and 704 through 709 are transfer gates which pass information from respective stages 1, 2 and 7 through 12 of the dividend register 10 in FIGURES 3 and 4 to the adder 46 in FIGURES 20 and 21. The gates 710 through 729 in FIGURES 14 through 17 are shift gates which supply information to the inputs of the dividend register 10 in FIGURES 3 through 6 displaced four positions to the left.

When the line 405 in FIGURES 13 through 17 is energized with a positive signal, gates 801 through 828 are operated, and information from respective stages 1 through 32 of the dividend register 10 in FIGURES 3 through 7 pass through these gates to respective output lines 851 through 878 with the exception that stages 3 through 7 have no gates associated therewith. The output lines 851, 852 and 854 through 859 pass through the cable 45 in FIGURES 13, 19 and 18 to the respective OR circuits 361 through 368 in FIGURES 18 and 19. The output lines 860 through 878 in FIGURES 14 through 17 pass through a cable 882 to respective OR circuits 259 through 227 in FIGURES 3 through 6. The gates 801, 802 and 804 through 809 are transfer gates which pass information from respective stages 1, 2 and 8 through 13 of the dividend register 10 in FIGURES 3 and 4 to the adder 46 in FIGURES 20 and 21. The gates 810 through 828 in FIGURES 14 through 17 are shift gates which supply information to the inputs of the dividend register 10 in FIGURES 3 through 6 displaced five positions to the left.

Figure 18:
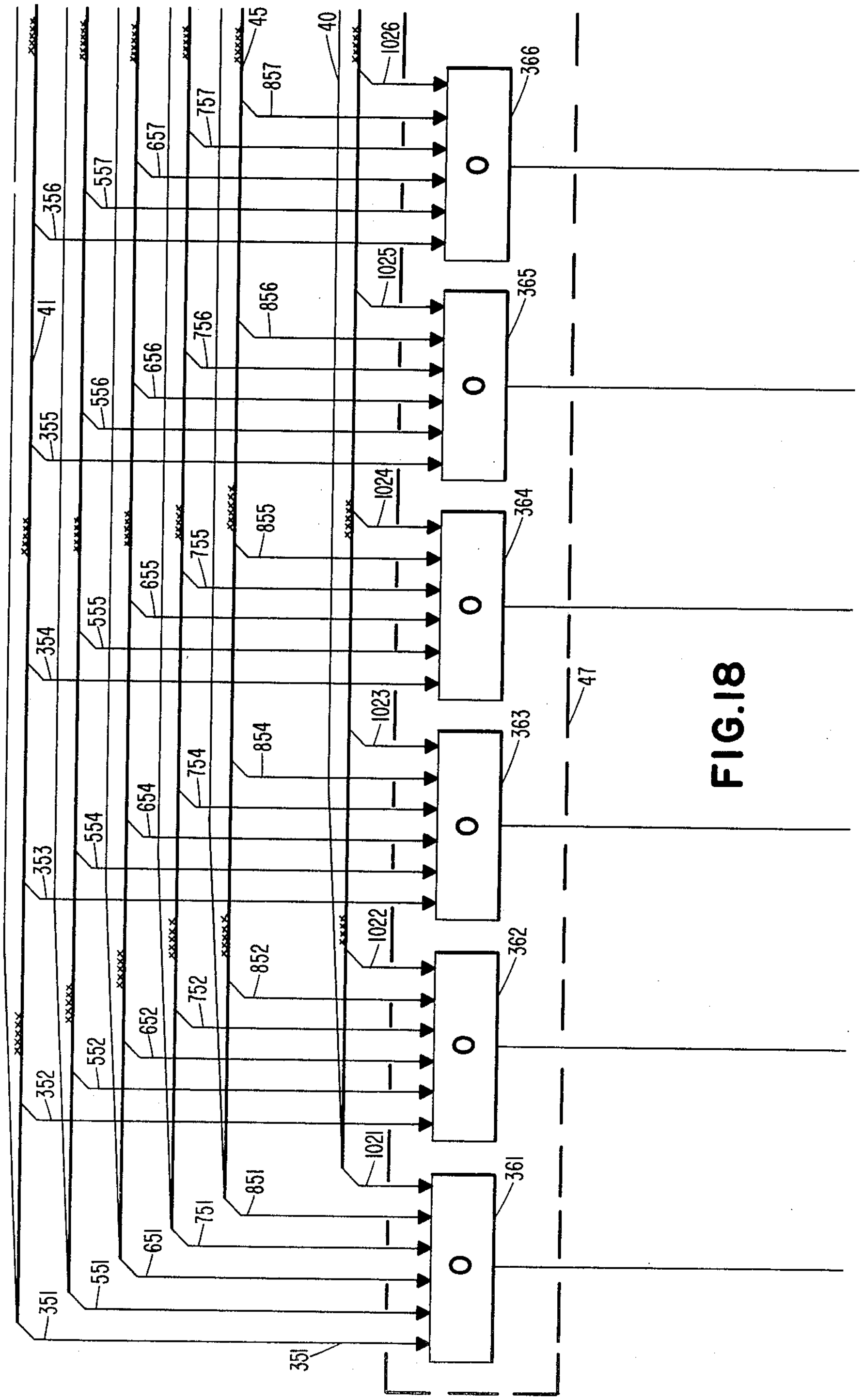
Figure 19:
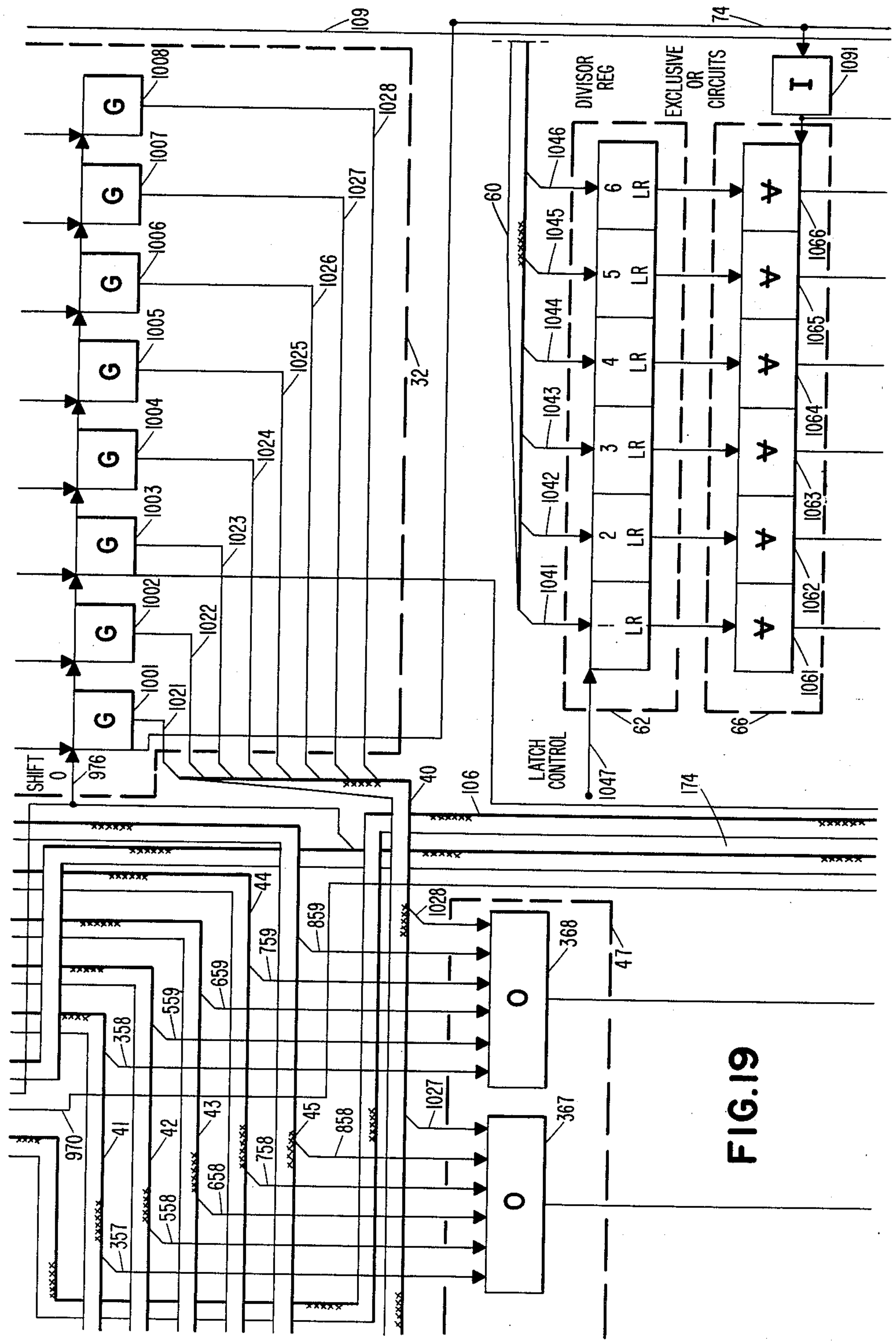

Preliminary to performing a divide operation signals representing the dividend are supplied on lines 901 through 932 of the cable 20 in FIGURES 3 through 7 to respective OR circuits 251 through 282 in FIGURES 3 through 7, and this information is stored in respective stages 1 through 32 of the dividend register 10. After each add operation is performed in the adder 46 in FIGURES 20 and 21, the result is supplied through the gates 940 through 947 which constitute a set of adder gates 102 in FIGURE 21, and along associated lines 950 through 957 disposed within a cable 106 which passes through FIGURES 21, 19, 13, 8 and 3 where the conductors 950 through 957 are connected to respective OR circuits 251 through 258, and this information is stored in respective stages 1 through 8 of the latch register 10 in FIGURE 3. With each add operation performed one or more quotient bits are generated. On the first add operation in a divide problem one quotient bit is generated. Signals representing a binary one or zero for such bit are supplied on the line 109 in FIGURE 23, and this line passes through FIGURES 21, 19, 13 through 17, 12, and 7 to the OR circuit 282. This information is stored in stage 32 of the dividend register 10 in FIGURE 7 which is an empty position initially. The stage 32 must be an empty stage initially because there is no shifting to the left of the information in the dividend register 10 in FIGURES 3 through 7 after the first add operation. However, the result of the addition in the adder 46 in FIGURES 18 and 19 is presented on the lines 950 through 957 of the cable 106 in FIGURE 3, as explained earlier, through the respective OR circuits 251 through 258 to respective stages 1 through 8 of the dividend register 10 in FIGURE 3, and this information must be stored in stages 1 through 8. For this purpose a positive pulse is applied to a latch control line 970 in FIGURE 3, and this pulse operates stages 1 through 8 to accept information from respective OR circuits 251 through 259. The positive pulse on the line 970 in FIGURE 3 is applied to a gate 974 which is deconditioned by a negative signal from an inverter 972 which in turn receives a positive signal on a line 976 at this time. The line 976 has a positive signal applied thereto whenever a shift of zero is selected, and a shift of zero always is selected for the first add cycle in a divide operation, and a shift of zero is never selected for the second or any subsequent add operation except for a shift of greater than five positions or for a termination operation in some cases.

Figure 21:
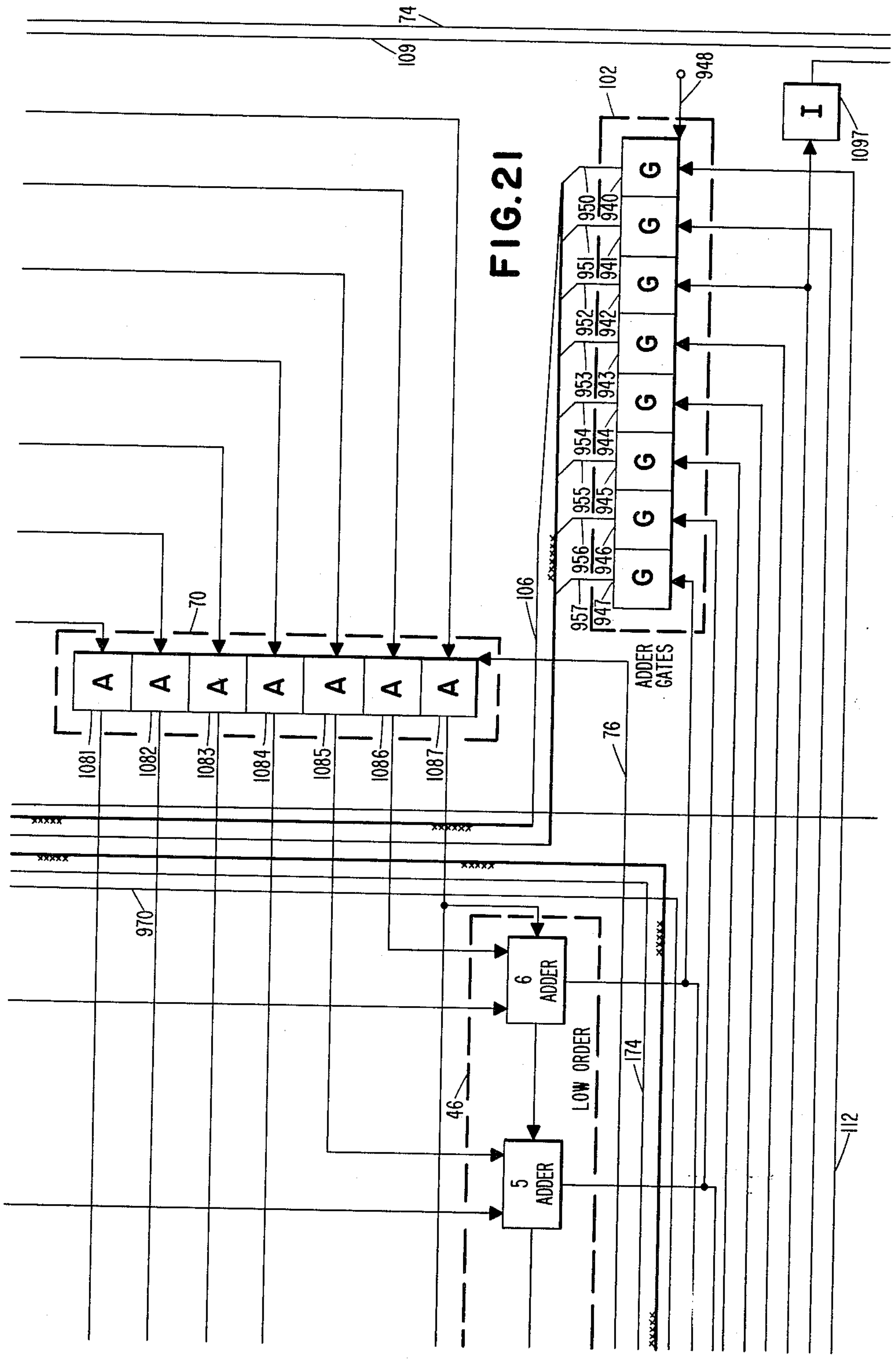
Figure 22:
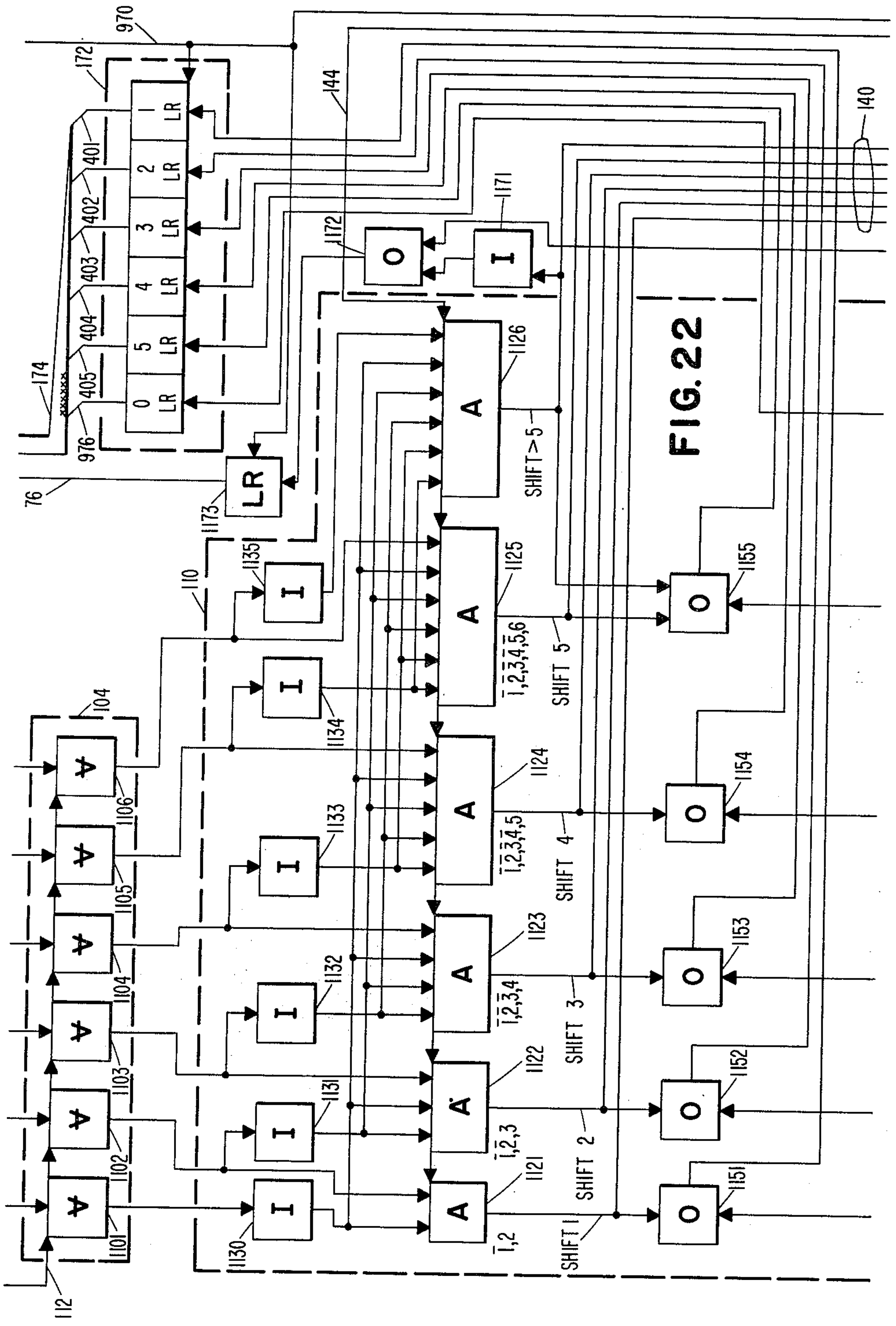

On the second or any subsequent add cycle when the information in stage 3 of the dividend register 10 is unlike the information in stage 4, the decoder 110 in FIGURE 22 already has determined during the previous add operation that a shift of one position is to take place. Accordingly, the shift 1 line 401 in FIGURES 3 through 7 is energized with a positive signal and the information in stages 1, 2 and 4 through 9 of the dividend register 10 is transferred through the gates 301 through 308 to the adder 46 in FIGURES 20 and 21. Upon completion of the add operation the correct quotient bit is supplied on the line 109 in FIGURE 23 which runs through the various drawings to the OR circuit 282 in FIGURE 7, as explained above, and the information supplied through this OR circuit to stage 32 of the dividend register 10 is stored therein after a positive pulse is applied to the line 970 in FIGURE 3. The positive pulse on the line 970 is applied to stages 1 through 8 of the dividend register 10 in FIGURE 3, and it is applied through a gate 974 to stages 10 through 32 of the dividend register 10 in FIGURES 4 through 7. This causes the result of the addition from the adder 46 in FIGURES 20 and 21 to be stored in stages 1 through 8 of the dividend register and the information in stages 10 through 32 to be transferred through respective gates 309 through 331 and be re-entered into the dividend register in respective stages 9 through 31, thereby effecting a shift of one position to the left. At the time the positive pulse is applied to the line 970, the signal level on the line 976 is a negative signal level because a shift of zero is not selected, and the inverter 972 inverts the negative signal level to a positive signal level and applies it to the gate 974, thus enabling this gate to pass the positive pulse on the line 970.

Figure 7:
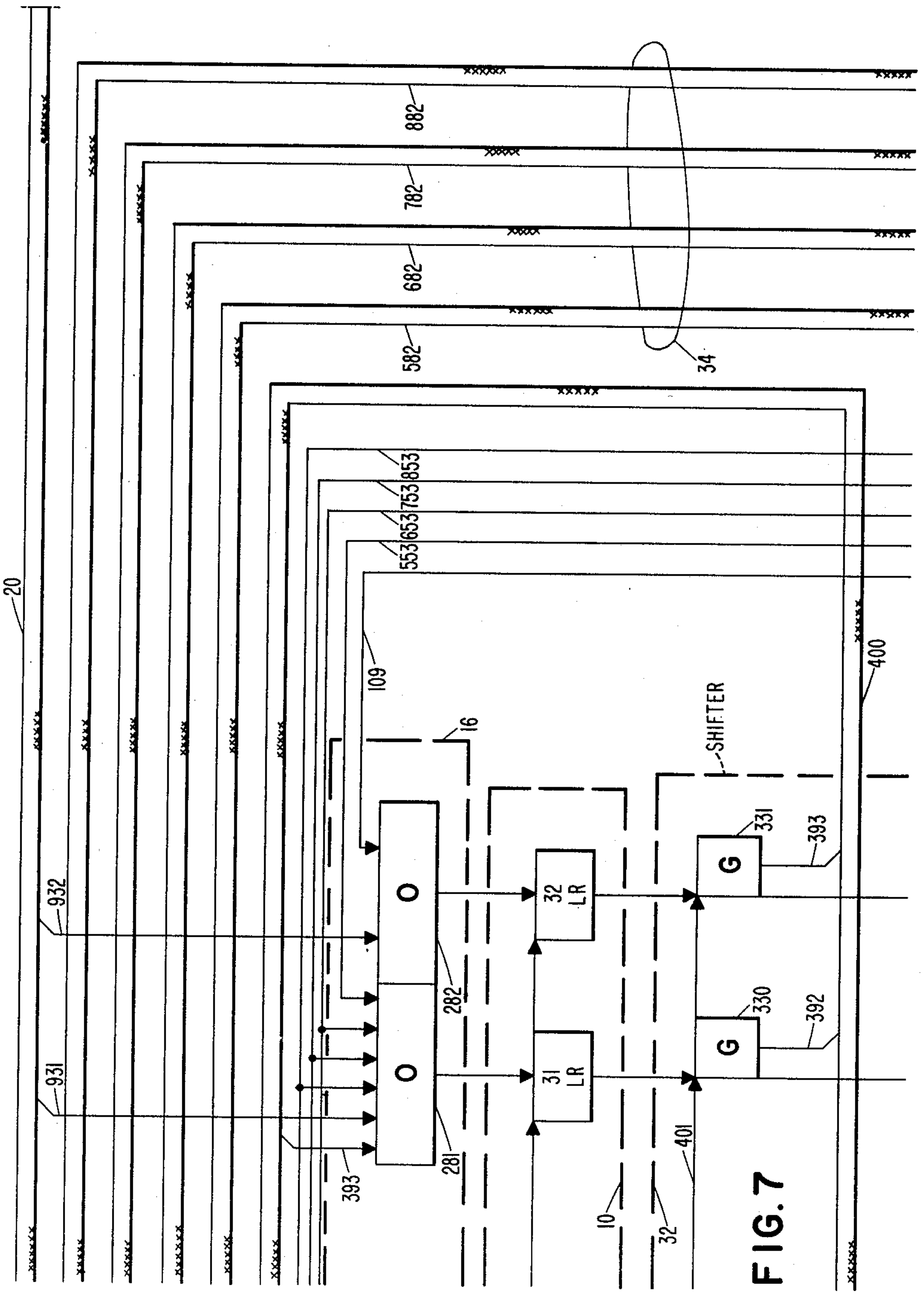
Figure 8:
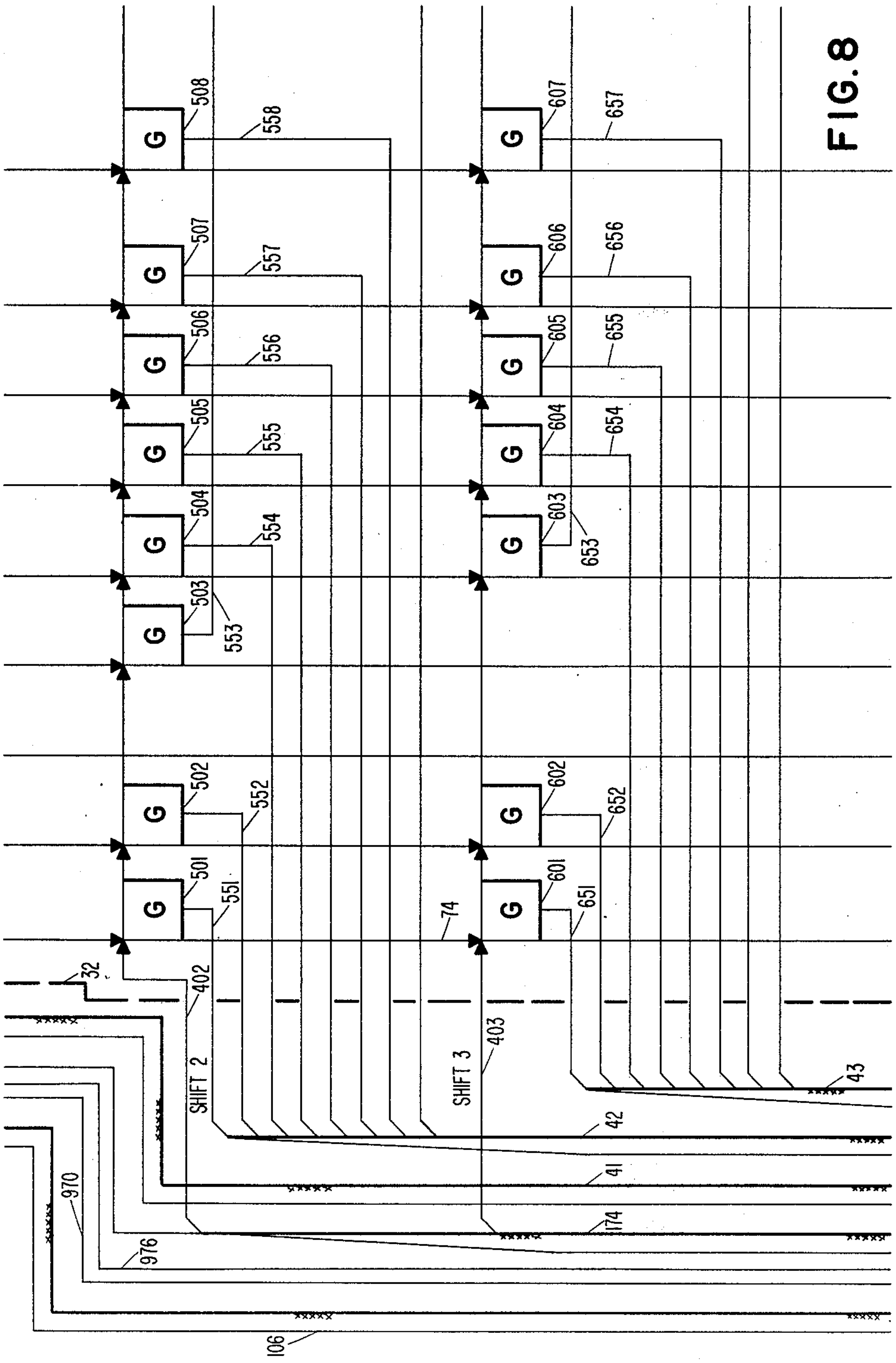
Figure 9:
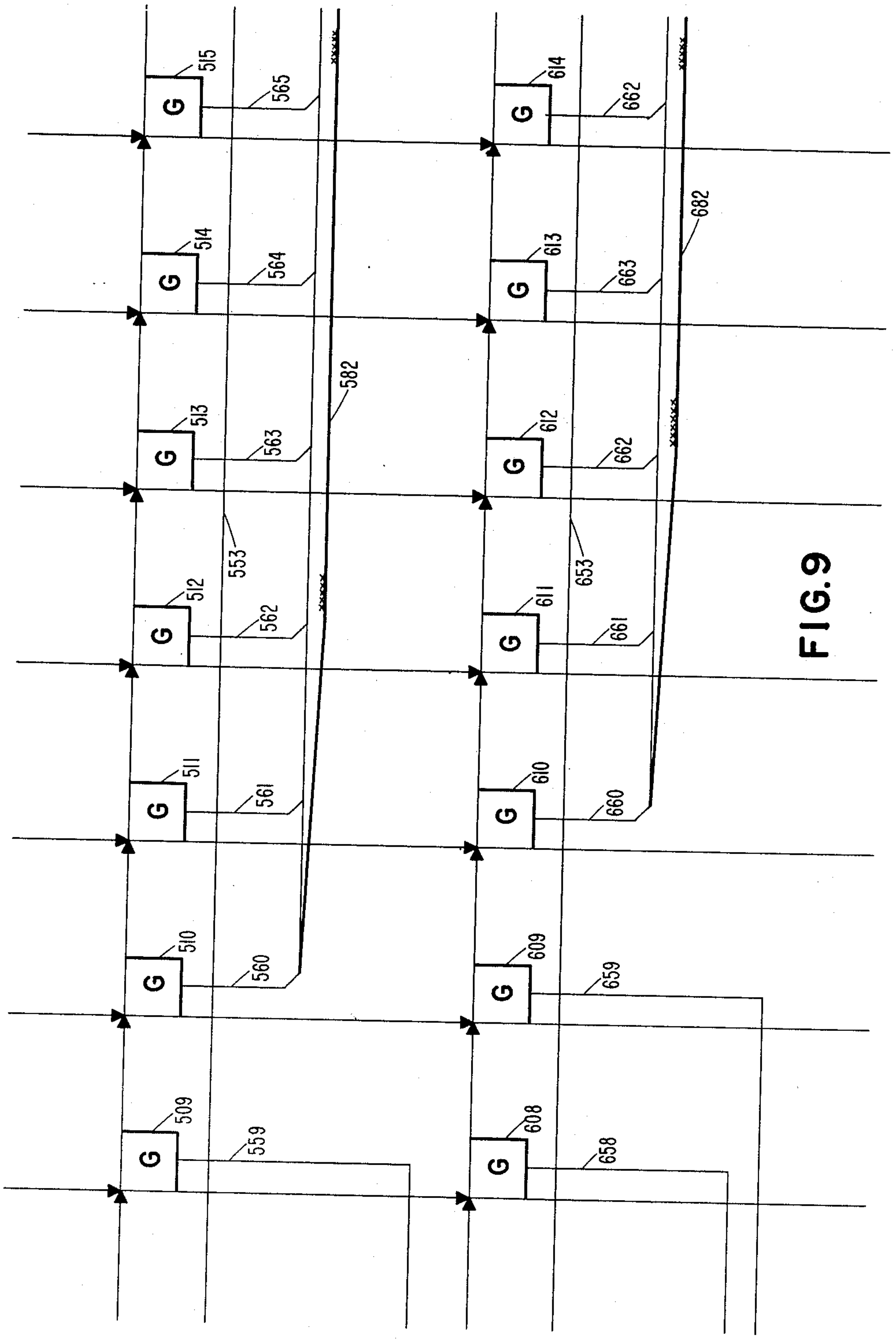
Figure 10:
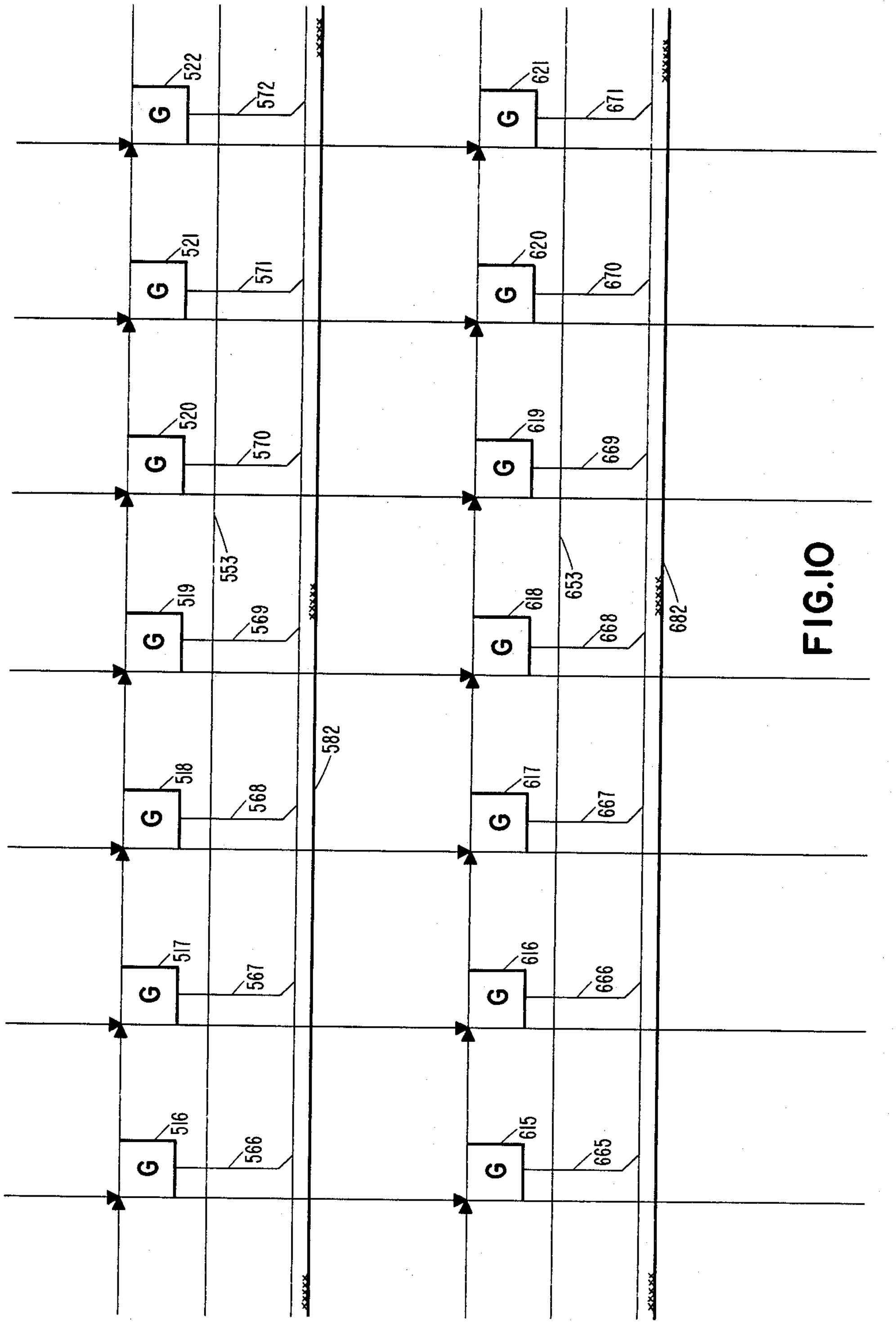
Figure 11:
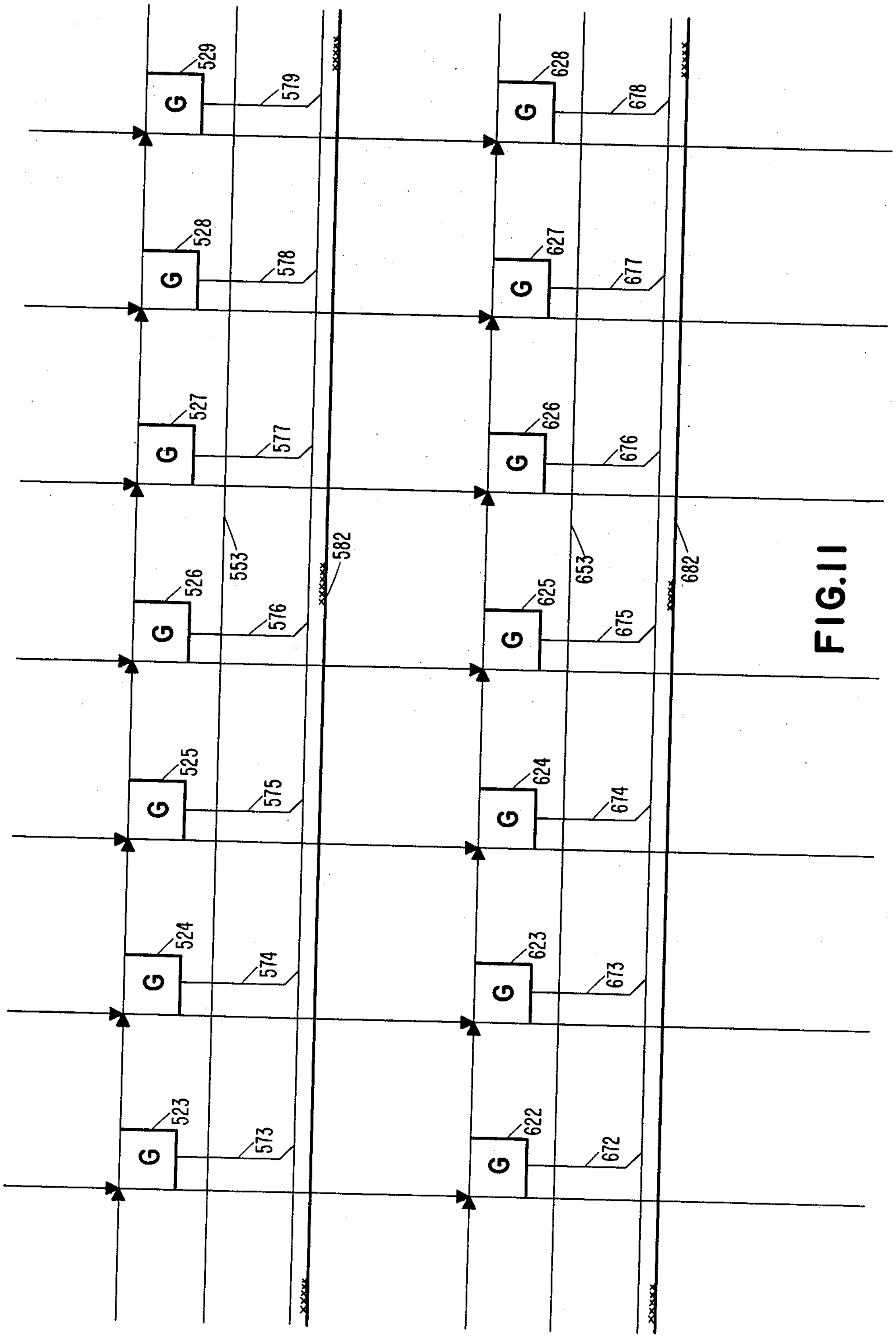
Figure 12:
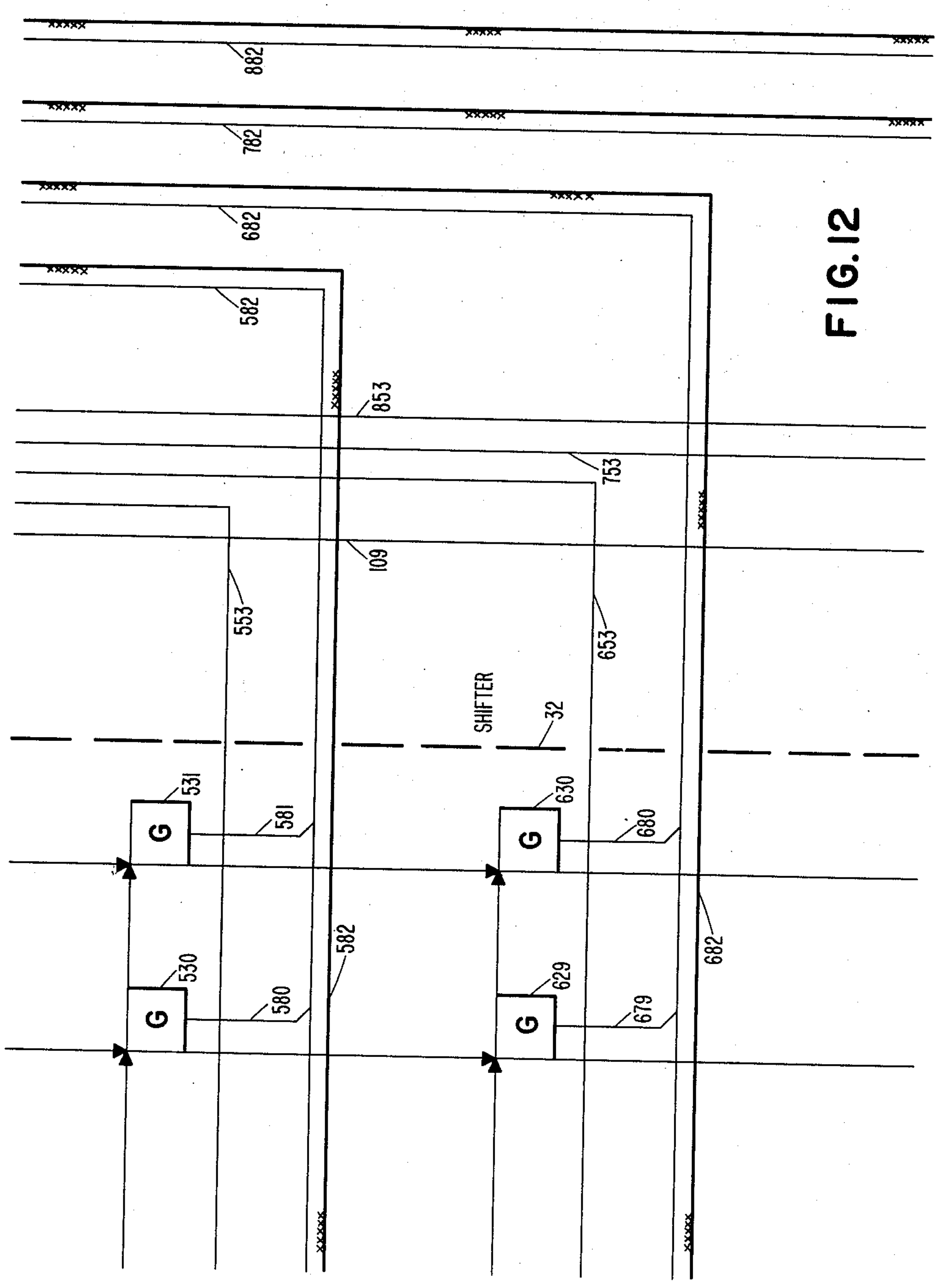
Figure 13:
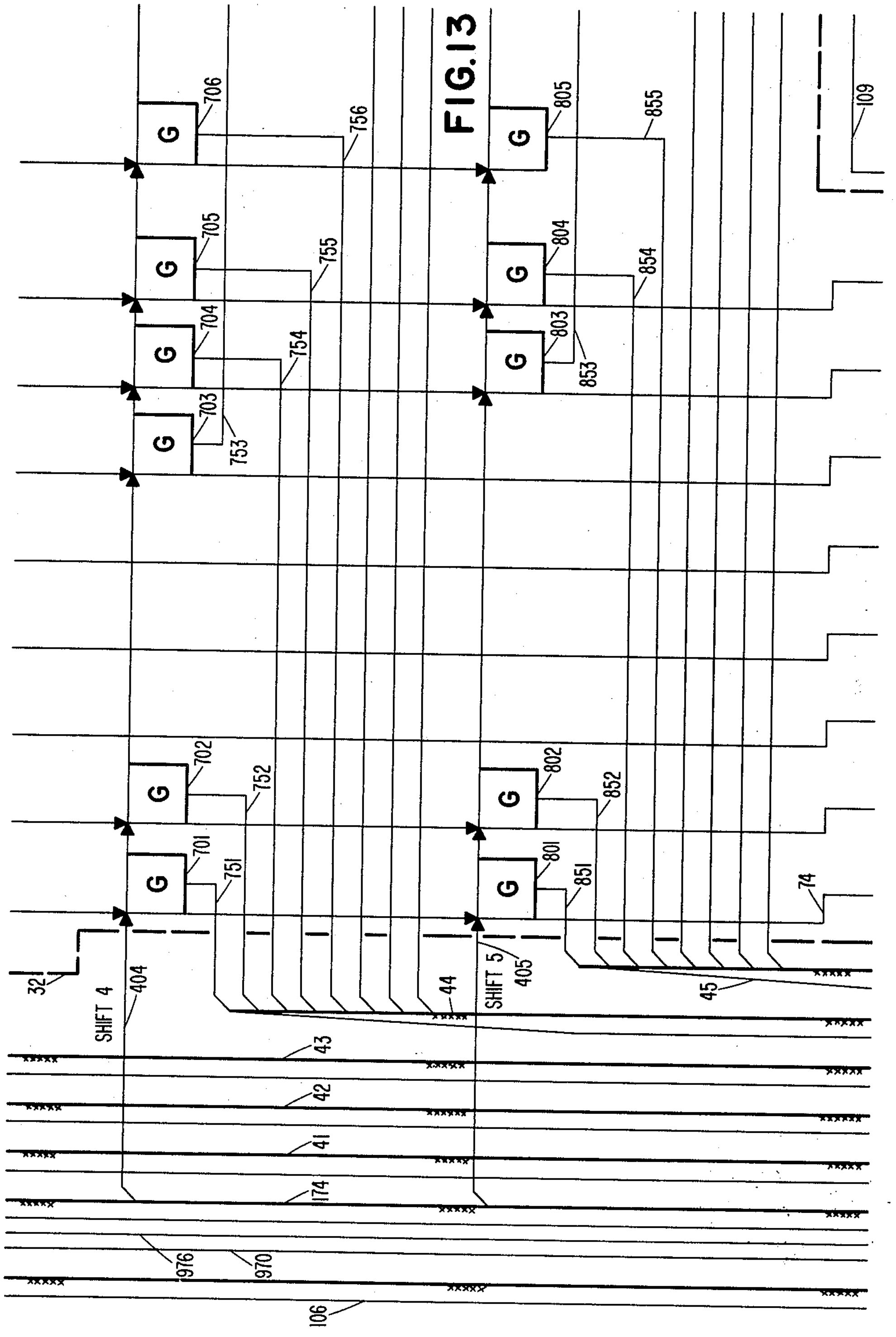
Figure 14:
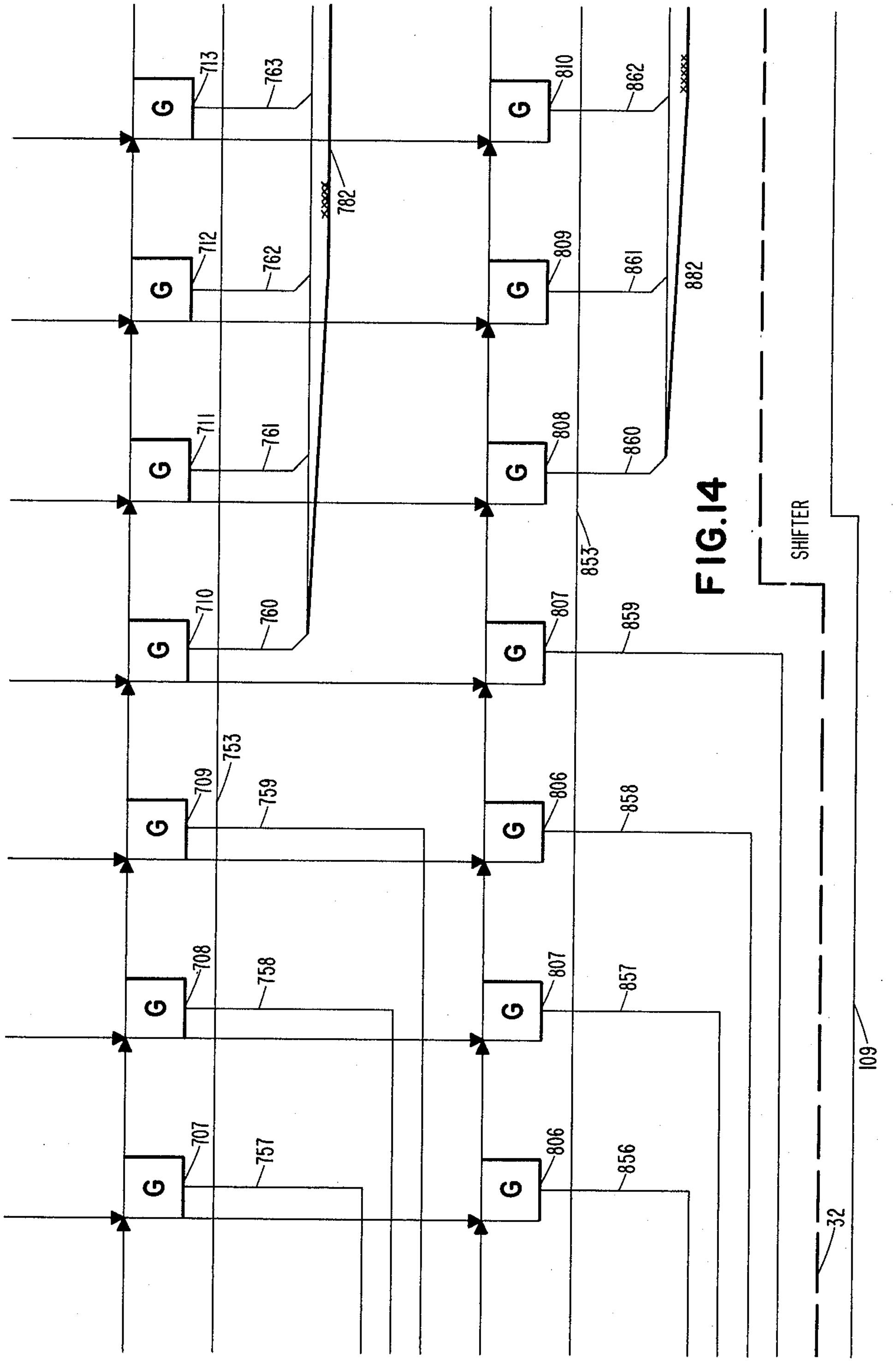
Figure 15:
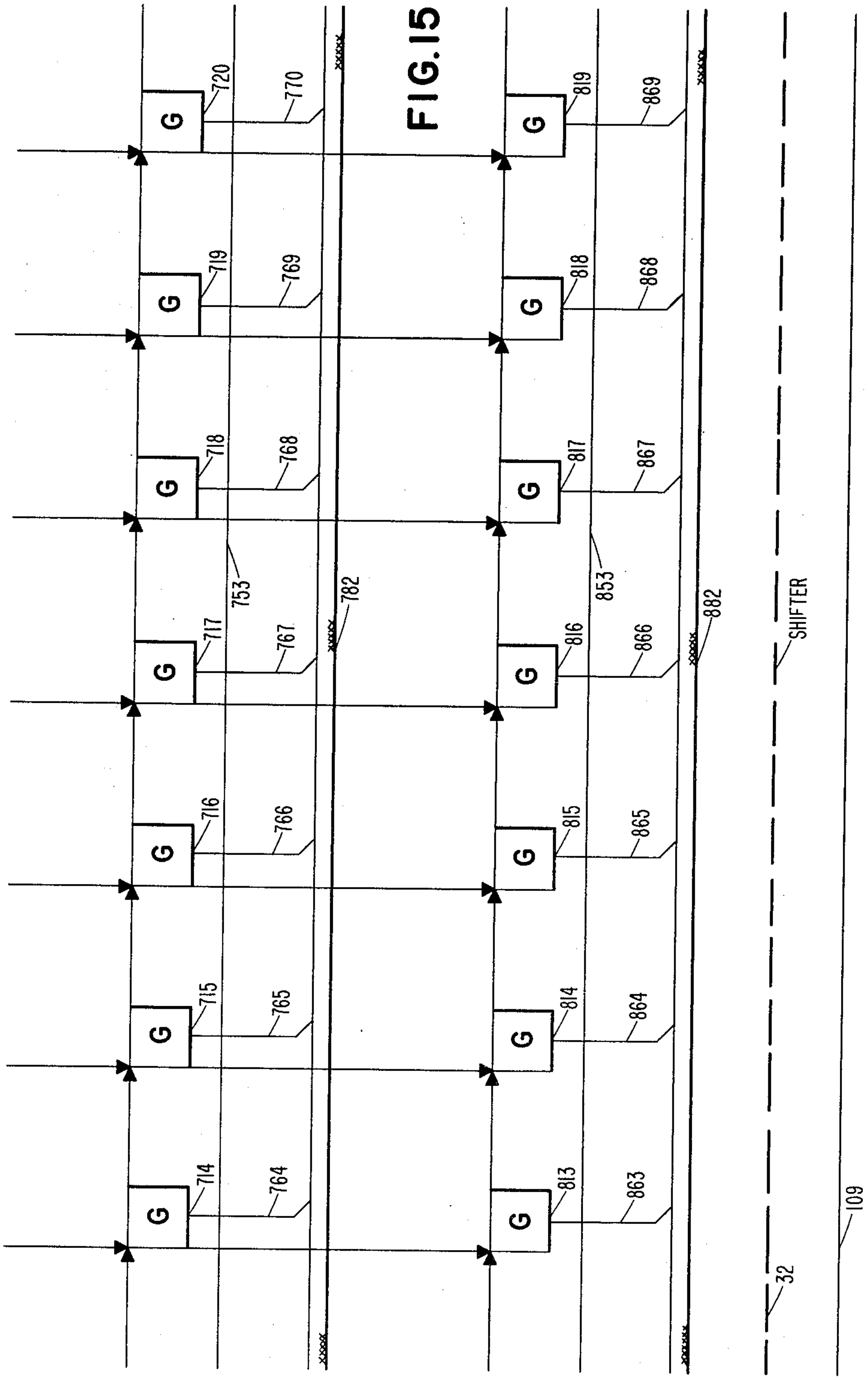
Figure 16:
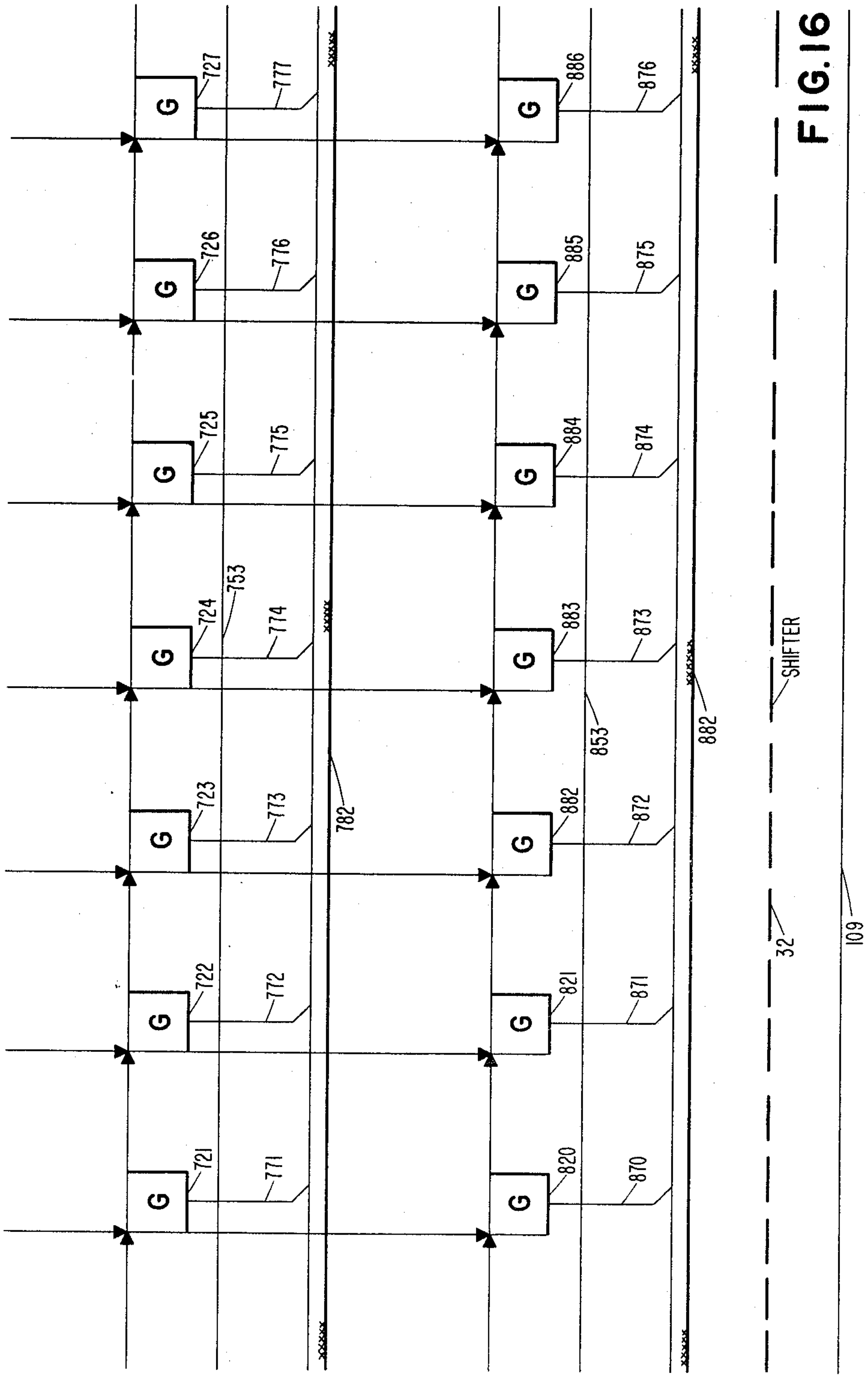
Figure 17:
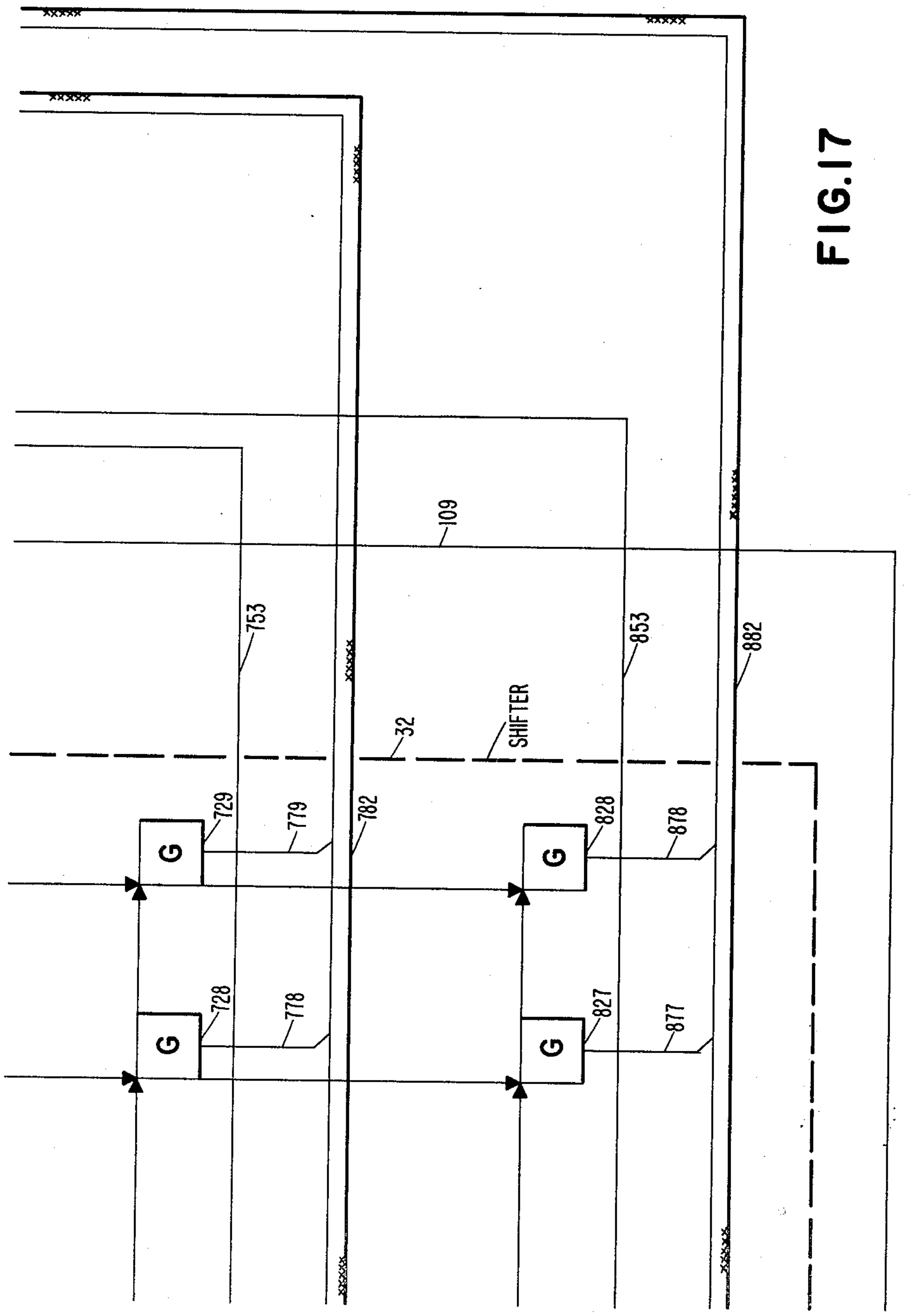

Whenever an add operation involves a shift of two, three, four or five positions of information in the dividend register 10 in FIGURES 3 through 7, the sequence of events is similar to that explained above with respect to a shift of one position with the exception that additional quotient bits must be generated. For a shift of two positions two quotient bits must be generated. One quotient bit is generated on the line 109 in FIGURE 23 and supplied to stage 32 of the dividend register 10 in FIGURE 7 as explained above, and a second quotient bit is generated by the gate 503 in FIGURE 8 and supplied on the line 553 in FIGURES 8 through 12 and 7 and applied through the OR circuit 281 to the stage 31 of the dividend register 10. Whenever an add operation involves a shift to the left of two positions of the information in the dividend register 10 in FIGS. 3 through 7, it indicates that the information in stages 3 and 4 of the dividend register are alike. That is, stages 3 and 4 both hold zeros or they both hold ones. If they both hold zeros, the proper quotient bit for stage 31 in FIG. 7 is a zero, and if stages 3 and 4 both hold ones, then the proper quotient bit for stage 31 in FIG. 7 is a one. Since stage 4 holds information which represents the proper quotient bit for the stage 31 in FIG. 7, it is seen that the gate 503 presents the proper quotient bit on its output line 553 whenever the shift 2 line 402 is energized with a positive signal. It is pointed out that the gate 503 would present the proper quotient bit on its output line 553 if it were connected to the output line of stage 3 and the shift two line 402. The selection abritrarily was made to place the gate 503 on the output line of stage four of the dividend register 10 in FIG. 3.

Whenever an add operation involves a shift of three positions of the information in the dividend register 10 in FIGS. 3 through 7, the sequence of events is the same as that explained above with reference to a shift of two positions of information in the dividend register during an add operation with the exception that three quotient bits, instead of two quotient bits, must be generated. More specifically, the quotient bit for stage 32 of the dividend register 10 in FIG. 7 is supplied on the line 109 in FIG. 23 through the various drawings, as explained above, to the stage 32 of the dividend register in FIG. 7. Two quotient bits, both being alike, must be generated and supplied to stages 30 and 31 of the dividend register in FIGS. 6 and 7. These two bits are generated by the gate 603 in FIG. 8 and supplied on the line 653 which passes through FIGS. 8 through 12, 7 and 6 to stages 30 and 31 of the dividend register. The quotient bit supplied by the gate 603 is correct because the information disposed in stages 3 through 5 of the dividend register 10 in FIG. 3 is a string of ones or a string of zeros. When a shift of four positions is involved during an add operation, the gate 703 in FIG. 13 generates the proper quotient bits for stages 29 through 31 of the dividend register 10 in FIGS. 6 and 7. The gate 703 presents the proper quotient bit on its output line 753 because the information in stages 3 through 6 of the dividend register 10 in FIG. 3 is a string of zeros or a string of ones. If the gate 703 is connected to the shift 4 line 404, it may be disposed on any one of the output lines of the stages 3 through 6 of the dividend register 10 in FIG. 3. Whenever an add operation involves a shift of five positions of the information in the dividend register 10 in FIGS. 3 through 7, the gate 803 in FIG. 13 generates the proper quotient bits for stages 28 through 31 of the dividend register 10 in FIGS. 6 and 7. The gate 803 generates the proper quotient bits for the stages 28 through 31 of the dividend register in FIGS. 6 and 7 because the information held in stages 3 through 7 is a string of ones or a string of zeros. If the gate 803 is connected to the shift 5 line 405 in FIG. 13, it may be disposed on any one of the output lines of the stages 3 through 7 of the dividend register 10 in FIG. 3. The disposition of the gate 803 on the output line of the stage 7 of the dividend register 10 in FIG. 3 is an arbitrary choice. As pointed out earlier a string of ones or a string of zeros in the dividend may be skipped and zeros or ones, as the case may be, inserted in the quotient for each bit skipped in the dividend except the last bit. It is necessary to perform an add operation of the dividend and the divisor before the lowest order quotient bit can be determined, and the output of the adder stage 1 of the adder 46 in FIGS. 20 and 21 controls the generation of this bit on the line 109 in FIG. 23 which is connected to the stage 32 of the dividend register 10 in FIG. 7 which stage always accepts the lowest order quotient bit.

Referring next to FIG. 19, gates 1001 through 1008 are connected to the output lines of respective stages 1 through 8 of the dividend register 10 in FIG. 3. These gates are conditioned by a positive signal on the shift 0 line 976, and they pass information from respective stages 1 through 8 of the dividend register 10 in FIG. 3 to corresponding lines 1021 through 1028 which are conveyed through the cable 40 in FIGS. 18 and 19 to associated OR circuits 361 through 368. The shift 0 line 976 in FIG. 19 operates the gates 1001 through 1008 to pass information from stages 1 through 8 of the dividend register 10 in FIG. 3 to the adder 46 in FIGS. 20 and 21 during the first add operation of a divide problem, whenever a shift of greater than five is being performed, and upon termination in some instances.

The divisor register 62 in FIG. 19 receives information on lines 1041 through 1046 from the cable 60, and this information is stored in associated stages 1 through 6 of the divisor register 62 upon the termination of a positive pulse applied to the latch control line 1047. The stages 1 through 6 of the divisor registers 62 are connected to respective stages 1061 through 1066 of the set of exclusive OR circuits 66, and the outputs of these exclusive OR circuits are connected to respective AND circuits 1081 through 1087. The outputs of these AND circuits in turn are connected as inputs to respective adder stages 1 through 6 of the adder 46.

Figure 20:
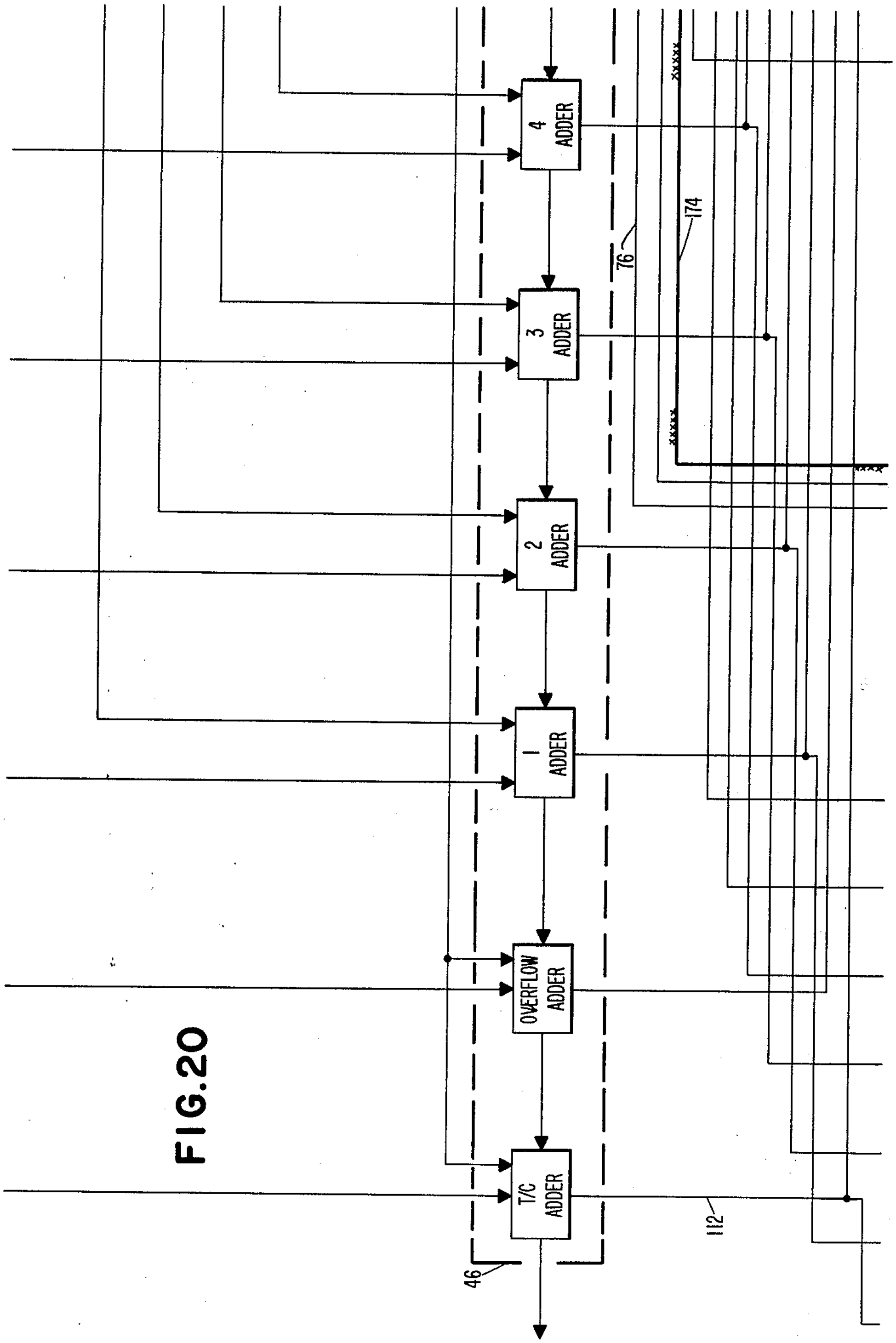

The sign of the divisor always is made unlike the sign of the dividend. The sign of the dividend is indicated by the information held in stage 1 of the dividend register 10 in FIG. 3. Signals representing the sign of the dividend are conveyed on the output line 74 of stage 1 of the dividend register 10 in FIG. 3, and this line is connected to an inverter 1091 in FIG. 19 the output of which is connected to the exclusive OR circuits 1061 through 1066. The output of the inverter 1091 operates the exclusive OR circuits 1061 through 1066 to make the divisor have a sign which is opposite to that of the dividend. The output of the inverter 1091 also is connected to an AND circuit 1087 the output of which is connected as an input to the adder stage 6, the overflow adder stage and the true or complement adder stage. The true or complement adder stage indicates the sign of the adder result. The AND circuits 1081 through 1087 are conditioned by signals on the line 76 in FIG. 21. The output of the adder stage 1 in FIG. 20 is connected to an inverter 1097 in FIG. 21. The signal applied to this inverter is inverted and used to generate the lowest order quotient bit. The adder stages 1 through 6 in FIGS. 20 and 21 have their outputs connected to respective exlusive OR circuits 1101 through 1106 which constitute a set of exclusive OR circuits 104 in FIG. 22. These exclusive OR circuits are controlled by signals on the line 112 from the ouput of the true or complement adder stage of the adder 46 in FIG. 20. The outputs of the adder 46 in FIGS. 20 and 21 are connected, as explained earlier, to the adder gates 102 in FIG. 21 from whence information is transferred to the first eight stages of the dividend register 10 in FIG. 3. The gates 102 in FIG. 21 are controlled by a level on the line 948, and these gates are conditioned to pass signals applied thereto throughout a divide problem.

The exclusive OR circuits 1102 through 1106 in FIG. 22 have their outputs connected to respective AND circuits 1121 through 1125, and the outputs of these exclusive OR circuits also are connected to respective inverter circuits 1131 through 1135. The outputs of the inverter circuits 1131 through 1135 are connected as shown to AND circuits 1122 through 1126. The inverter circuit 1130 has its output connected to each of the AND circuits 1121 through 1126. The AND circuits 1121 through 1126 are selected for operation by a positive signal on the line 144 which is connected to the carry output of the high order adder stage of the adder 142 in FIG. 25. Signals from the exclusive OR circuits 104 to the AND circuits 1121 through 1126 cause one of these AND circuits to provide a positive output signal and the remaining ones to provide a negative output signal whenever the line 144 has a positive signal. The AND circuits 1121 through 1125 have their outputs connected to respective OR circuits 1151 through 1155. The AND circuit 1126 has its output connected to the OR circuit 1155, and this AND circuit has a positive output whenever a shift greater than five is selected. The outputs of the OR circuits 1151 through 1155 indicate respective shifts of 1 through 5. The outputs of the OR circuits 1151 through 1155 are connected to respective stages 1 through 5 of the shift control register 172. The output lines of the shift control register 172 are the conductors 401 through 405 and 976 of respective stages 1 through 5 and 0. These conductors pass through a cable 174 in FIGS. 22, 18, 19, 13, 8 and 3 where they control the selection of transfer gates and shift gates as explained above.

The function of the AND circuits 1121 through 1126 in FIG. 22 is to determine the number of leading zeros in the dividend when it is true and the number of leading ones in the dividend when it is in complement form. As stated earlier the decoding operation which takes place during one cycle of operation is used during the subsequent cycle to indicate the number of leading zeros or ones. The output of the adder 46 in FIGS. 20 and 21 is supplied to the AND circuits 1121 through 1126 in FIG. 22 for a decoding operation during a current cycle; the selected AND circuit energizes one of the OR circuits 1151 through 1155 with a positive signal which in turn energizes one of the input lines to the latch register 172 with a positive signal; and simultaneously this information is stored in the shift control register 172 as the result from the adder 46 in FIGS. 20 and 21 is stored in positions 1 through 8 of a dividend register in FIG. 3 because both registers are operated by a positive pulse on the line 970 in FIGS. 3 and 22. It is pointed out that the result from adder stages 1 through 6 in FIGS. 20 and 21 is stored in stages 3 through 8 of the dividend register 10 in FIG. 3. The output from the true or complement stage and the output from the overflow stage of the adder 46 in FIG. 20 are stored in respective stages 1 and 2 of the dividend register 10 in FIG. 3. It is seen therefore that stage 3 of the dividend register in FIG. 3 represents the most significant bit of the dividend. Accordingly, adder stages 1 through 6 of the adder 46 in FIGS. 20 and 21 are examined for a string of ones or a string of zeros.

When the dividend is true, leading zeros in the form of negative signals from the adder 46 are detected by the AND circuits 1121 to 1126 because the true or complement adder stage of the adder 46 in FIG. 20 provides a negative signal on the output line 112 to the exclusive OR circuits 104 in FIG. 22, and these exclusive OR circuits thereby are operated to pass any positive signals applied as inputs thereto directly to the AND circuits 1121 through 1125. The conditions of the ouputs of the adder stages 1 through 6 in FIGS. 20 and 21 which select the AND circuits 1121 through 1125 are indicated immediately below and to the left of these AND circuits. For example, the AND circuit 1121 provides a positive output signal to the OR circuit 1151 whenever the adder stage 1 provides a negative output signal representing a binary zero and the adder stage 2 in FIG. 20 provides a positive output signal representative of binary one. In this case a shift of one position across a single zero is indicated. Whenever the AND circuit 1122 provides a positive output signal to the OR circuit 1152, the outputs of the adder stages 1 and 2 in FIG. 20 must be negative, indicating binary zeros, and the output of adder stage 3 must be positive, indicating a binary one. Thus a positive signal from the AND circuit 1122 signifies a string of two zeros. It is readily seen therefore that the AND circuits 1123 through 1125 signify a string of three, four and five zeros, respectively, when they provide positive output signals. When there are more than five zeros in a string, none of the AND circuits 1121 through 1125 is selected, but the AND circuit 1126 is selected in this case. The output of this AND circuit is connected to the OR circuit 1155 to cause a shift of five positions to take place. The output of the AND circuit 1126 also is connected through an inverter 1171 to an OR circuit 1172 the output of which is applied to a latch register circuit 1173, and its output is conveyed along the line 76 to the AND circuits 70 in FIG. 21. The level on the line 76 admits or inhibits the entry of the divisor to the adder 46 in FIGS. 20 and 21. The positive signal from the AND circuit 1126 in this case is inverted in the inverter 1171 to a negative level, and this negative level is supplied through the OR circuit 1172 to the latch register circuit 1173 which controls the signal level applied to AND circuits 70 in FIG. 21 during the next cycle. During the next cycle a negative level on the line 76 to the AND circuits 70 in FIG. 21 causes all of the outputs of the AND circuits 1081 through 1087 to be negative, representing binary zeros, and information in stages 1, 2 and 8 through 13 of the dividend register 10 which is supplied to the adder 46 appears at the output of the adder 46 without modification. Thus, a shift across the information in stages 3 through 7 of the dividend register is made. At this time another decoding operation takes place in the AND circuits 1121 through 1126, and if the string of zeros continues beyond five more positions, the foregoing sequence is repeated because the output of the AND circuit 1126 again is made positive. In case a shift of five or less is decoded, the output of the AND circuit 1126 becomes negative, and the inverter 1171 inverts this level to a positive level and supplies it through the OR circuit 1172 and the latch register 1173 to the AND circuits 70 in FIG. 22 during the next cycle, thereby permitting entry of the divisor to the adder 46 in FIGS. 20 and 21 during that cycle. It is seen therefore how the AND circuits 1121 through 1126 decode and determine the number of zeros in a string.

When the dividend is in complement form, the AND circuits 1121 through 1126 are operated to determine the number of leading ones in the form of positive signals from the adder 46. In this case the output of the true or complement adder stage in the adder 46 in FIG. 20 is a positive signal representing a binary one, and it is applied on the line 112 to the exclusive OR circuits 104. A positive signal on the line 112 causes positive signals applied to the exclusive OR circuits 1101 through 1106 from the adder stages 1 through 6 to be changed to negative signals at the outputs of these exclusive OR circuits, and negative signals applied to the exclusive OR circuits 1101 through 1106 from the adder stages 1 through 6 are changed to positive signals at the outputs of these exclusive OR circuits. Negative signals passed by the exclusive OR circuits 1102 through 1106 are applied directly to AND circuits 1121 through 1125. Positive signals passed by the exclusive OR circuits 1101 through 1106 are inverted by the inverters 1130 through 1135 and applied as positive signals to respective AND circuits 1121 through 1126. The output signals from the adder stages 1 through 6 in FIGS. 20 and 21 operate the AND circuits 1121 through 1126 in the manner explained above with respect to the decoding of a string of zeros, and the condition of the outputs of the adder stages 1 through 6 in FIGS. 20 and 21 which select these AND circuits are indicated below and to the left of them. When the output signal from the true or complement adder stage of the adder 46 in FIG. 20 is a positive signal representing a binary one, the output of the adder stage 1 of this adder always has a positive output signal representing a binary one. This positive signal is inverted by the exclusive OR circuit 1101 to a negative level which level is inverted to a positive level by the inverter 1130, whereby a positive signal is applied to the AND circuit 1121. If the output of the adder stage 2 of the adder 46 in FIG. 20 is a negative signal level representing a binary zero, this negative signal level is inverted to a positive level by the exclusive OR circuit 1102, and the positive level is applied directly to the AND circuit 1121. Thus, both inputs to the AND circuit 1121 are positive which causes the output line therefrom to the OR circuit 1151 to have a positive level. This indicates a shift of one position over a single one in the dividend for the next add operation. It is readily seen how a shift of 2 through 5 positions is decoded in respective AND circuits 1122 through 1125. It is seen further that for shifts of six or more positions the AND circuit 1126 is selected, and it in turn operates the inverter 1171, the OR circuit 1172 and the latch register circuit 1173 to inhibit entry of the divisor into the adder 46 during the next add operation when a shift of five positions is made. Such shifts of five positions may be repeated without performing an add operation until a shift of five positions or less is decoded in which event a shift of that amount and an add operation takes place during the next cycle operation.

Figure 24:
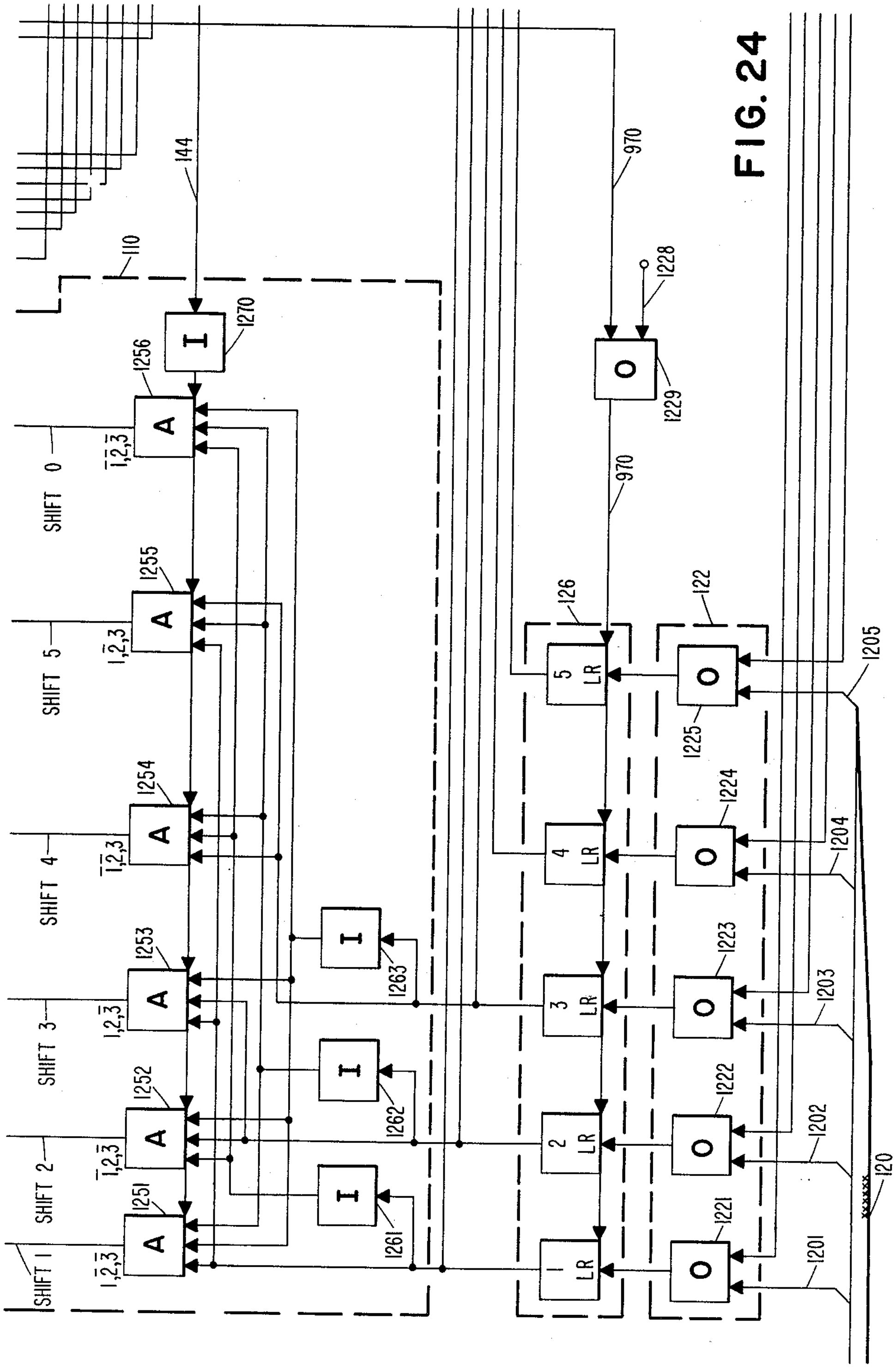

Preliminary to commencing a divide operation, information from a storage device not shown is supplied along the conductors 1201 through 1205 of the cable 120 in FIG. 24 to respective OR circuits 1221 through 1225, and this information is supplied to respective stages 1 through 5 of the shift count register 126. This information is stored in the shift count register 126 upon the termination of a positive pulse applied to a line 1228 to an OR circuit 1229. The number thus stored in the shift count register 126 represents the number of quotient bits which are to be generated for a given divide problem. This number also represents the number of shifts available for shifting the dividend, and the three lowest order bits have their outputs connected to AND circuits 1251 through 1256. Stage 1 of the shift count register 126 is the lowest order position. The outputs from stages 1 through 3 of the shift count register 126 are connected to respective inverter circuits 1261 through 1263 the outputs of which are connected to the AND circuits 1251 through 1256 as shown in FIG. 24. The conditions on which the selection of the AND circuits 1251 through 1256 depends is illustrated at the top on the left of these AND circuits, and the numbers refer to information held in respective stages 1 through 3 of the shift count register 126. To illustrate the operation of the AND circuit 1251, it provides a positive output signal whenever stage 1 has a binary one, and stages 2 and 3 have binary zeros. A binary one in stage 1 is represented by a positive signal which is applied directly to the AND circuit 1251. The stage 2 has a negative signal representing a binary zero, and this signal is inverted in the inverter circuit 1262 and applied to the AND circuit 1251. The stage 3 has a negative signal representing binary zero which is inverted by the inverter 1263 and applied to the AND circuit 1251 as a positive signal. Thus, all three inputs to the AND circuit 1251 are positive under the assumed conditions, and its output becomes a positive level indicating that a shift of one is available before completing the generation of the required number of quotient bits. By observing the inputs to the AND circuits 1252 through 1256, it is readily seen how available shifts of two through five and zero are decoded and indicated. The foregoing decoding operations may take place if, and only if, a positive signal is applied to the AND circuits 1251 through 1256 from an inverter circuit 1270. The inverter circuit 1270 receives a positive signal on the line 144 from the carry output of the highest order adder stage in the shift count adder 142 in FIG. 25 until the number in the shift count register 126 becomes smaller than the number of shifts decoded and requested by the AND circuits 1121 through 1126. In this event the number of shifts requested by the decoding operation in the AND circuits 1121 through 1126 in FIG. 22 would, if not inhibited, cause the generation of more quotient bits than required, and some of the high order quotient bits in stages 9, 10, 11 and so forth of the dividend register 10 in FIG. 4 would be shifted to the left into a portion of the remainder usually stored in positions 1 through 8 of the dividend register 10 in FIG. 3. Such an occurrence is prevented by the carry output signal from the highest order stage of the shift counter adder 42 in FIG. 25 because this carry output signal changes from a positive level representing a binary one to a negative level representing a binary zero whenever the number of shifts requested by the AND circuits 1121 through 1126 exceeds the number of shifts available as decoded by the AND circuits 1251 through 1256 in FIG. 24. The manner in which this change in potential is developed is explained more fully hereinafter.

Figure 25:
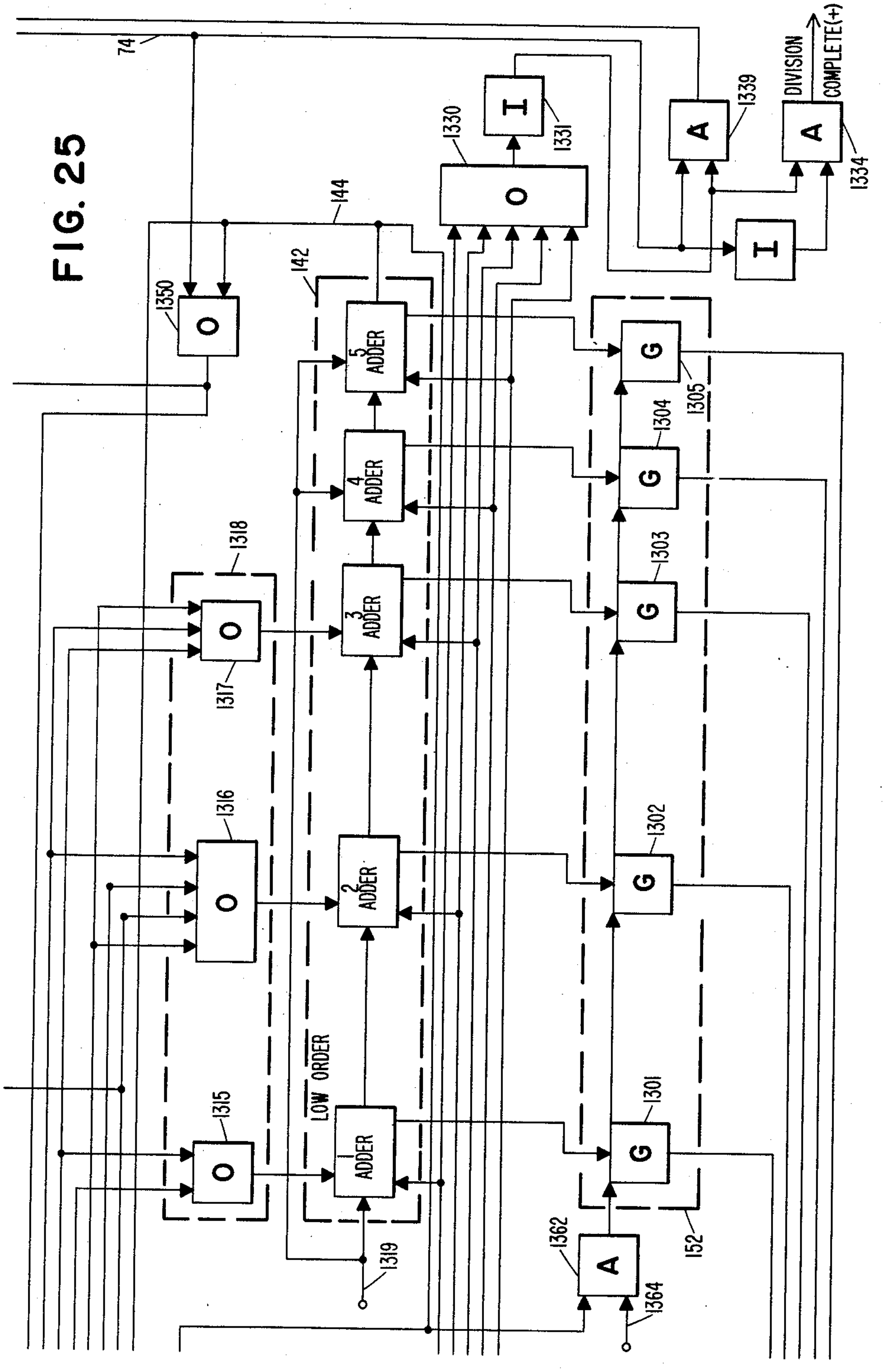

Accordingly, a negative level on the line 144 in FIG. 25 is conveyed to the inverter circuit 1270 in FIG. 24 where the level is inverted to a positive level which conditions the AND circuits 1251 through 1256. The negative level on the line 144 in FIG. 25 is applied to the AND circuits 1121 through 1126 in FIG. 22, thereby deconditioning these AND circuits and causing them to supply negative levels to associated OR circuits 1151 through 1155. One of the AND circuits 1251 through 1255 is selected and it supplies a positive level through an associated one of the OR circuits 1151 through 1155 in FIG. 22 to one of the associated stages 1 through 5 of the shift control register 172. Whenever the AND circuit 1256 in FIG. 24 is selected, it supplies a positive level to stage 0 of the shift control register 172 in FIG. 22, thereby indicating that the required number of quotient bits are being generated in the current cycle and no further shifts are required in the next cycle.

Figure 26:
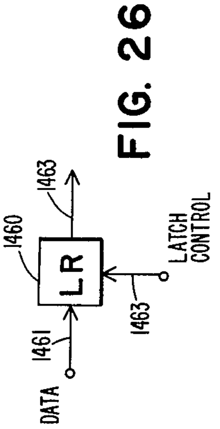
FIGURE 26 illustrates a latch register circuit in block form and FIGURE 27 illustrates in detail the logic circuits employed in the latch register circuit of FIGURE 26.

Reference is made to FIG. 25 for a description of the shift count adder 142. This adder has stages 1 through 5 the outputs of which are connected to respective gates 1301 through 1305 which in turn have their outputs connected through respective OR circuits 1221 through 1225 to respective stages 1 through 5 of the shift count register 126. The result from the shift count adder 142 in FIG. 25 is thus stored in the shift count register 126 in FIG. 24 after each add operation when a positive pulse is applied and terminated on the line 970. This positive pulse is applied through the OR circuit 1229 to the shift count register 126. Information from stages 1 through 5 of this register is presented to associated adder stages 1 through 5 of the shift count adder 142 in FIG. 25 continuously. The number represented in the shift count register 126 in FIG. 26 is presented in true form to the shift count adder 142 in FIG. 25.

The number of shifts requested by the decoding operation in the AND circuits 1121 through 1126, in FIG. 22 is supplied as a binary number in complement form to the shift count adder 142 in FIG. 25. The output lines of the AND circuits 1121 through 1125 are connected as shown to various ones of the OR circuits 315 through 317 which constitute an encoder 1318. These OR circuits are connected to associated adder stages 1 through 3 of the shift count adder 142 in FIG. 25. For purposes of illustration, let it be assumed that the AND circuit 1121 in FIG. 22 is selected. Its output signal is a positive level indicating a shift of one position, and a positive level is applied to the OR circuit 1151 to accomplish a shift of one position during the next add operation as explained previously. The positive output level from the AND circuit 1121 in FIG. 22 also is connected to the OR circuits 1316 and 1317 of the encoder 318. The OR circuits 316 and 317 present positive signal to stages 2 and 3 of the shift count adder 142 and the OR circuit 315 supplies a negative signal level to the adder stage 1 of the shift count adder 142. Accordingly, the three bit binary number presented to adder stages 1 through 3 by the AND circuit 1121 in FIG. 22 is 011 which is the complement of binary one. The complement binary numbers supplied to the shift count adder 142 in FIG. 25 by the selected one of the AND circuits 1121 through 1126 in FIG. 22 is indicated below in Table 2:

*Table 2*

| AND Ckt. Selected | Shifts Requested | True Binary Value | Complement Binary Value |
|---|---|---|---|
| 1121 | 1 | 100 | 011 |
| 1122 | 2 | 010 | 101 |
| 1123 | 3 | 110 | 001 |
| 1124 | 4 | 001 | 110 |
| 1125 | 5 | 101 | 010 |
| 1126 | *X | | 010 |

*X=shifts greater than 5.

The shift count adder 142 in FIG. 25 has an input line 1319 which is connected to the carry input of the adder stage 1, and this line is connected as an input to both of the adder stages 4 and 5 of the shift count adder 142. It is pointed out that the binary number from the encoder 1318 to adder stages 1 through 3 is a complement number, and a positive signal is continuously applied to the line 319 during a divide problem which inserts binary ones in both of the adder stages 4 and 5. It is seen, therefore, that the requested number of shifts decoded by the AND circuits 1121 through 1125 in FIG. 22 is supplied as a binary number in complement form to the shift count adder 142 in FIG. 24. This complement number is a negative number which is represented by the one's complement, and it is converted to the two's complement by adding another binary one in the lowest order stage. This additional binary one is supplied to adder stage 1 by the positive signal on the line 1319. A positive binary number representative of the number of shifts available is supplied to the shift count adder 142 in FIG. 25 from the shift count register 126 in FIG. 24. Thus a positive number and a negative number are supplied to the shift count adder 142. As long as the positive number is greater than the negative number, the carry output from the adder stage 5 is a positive signal representing a binary one. As soon as the negative number exceeds the positive number, the carry output from the adder 5 becomes negative signal representing a binary zero. The carry output signal appears on the line 144. When the carry output signal is positive, the AND circuits 1121 through 1126 are selected for operation, and the AND circuits 1251 through 1256 are de-selected. Whenever the carry output signal on the line 144 becomes negative, the AND circuits 1121 through 1126 in FIG. 22 are de-selected, and the AND circuits 1251 through 1256 in FIG. 24 are selected for operation. It is seen, therefore, that the carry output signal from the shift count adder 142 in FIG. 25 controls the decoder 110 in FIGS. 22 and 24 to generate the precise number of quotient bits specified by the shift count register 126 in FIG. 24.

The AND circuits, OR circuits, exclusive OR circuits and inverter circuits employed in the multiplier arrangement of this invention may be any one of various suitable types, and a detailed consideration of them is not considered necessary since they are so widely known.

Figure 27:
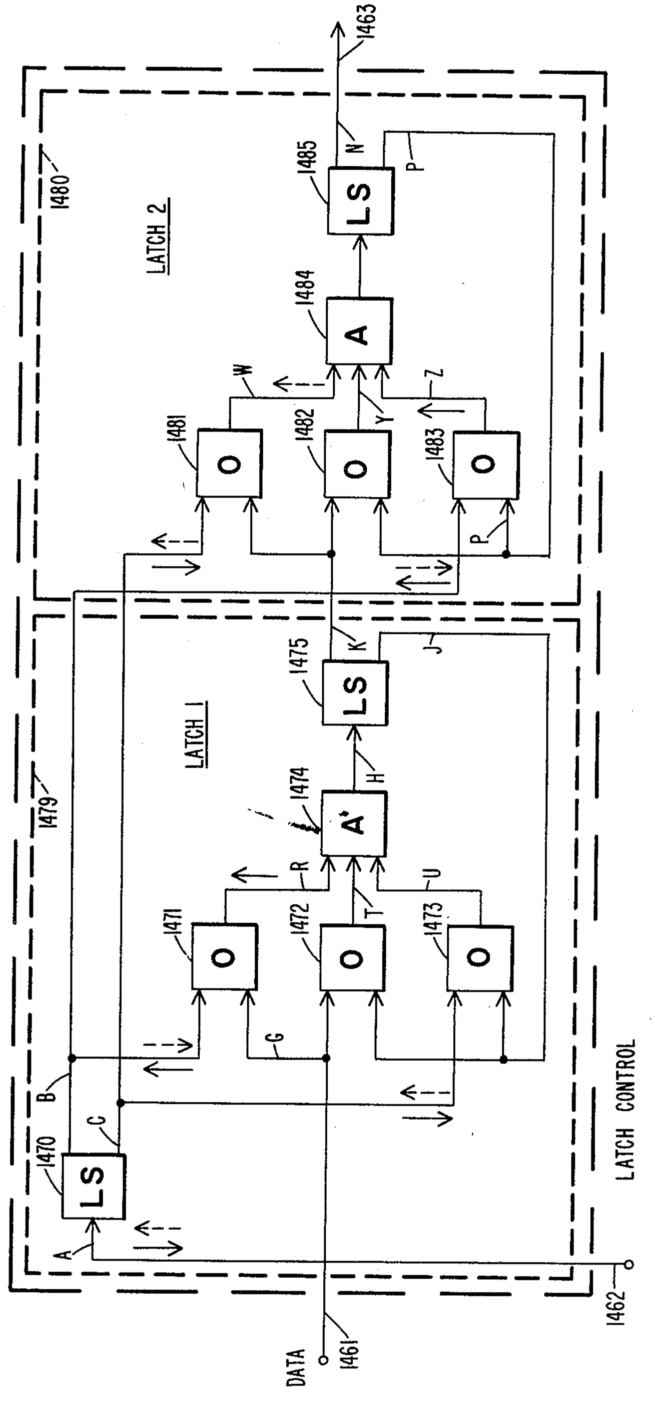

Reference is made to FIGS. 26 and 27 for a detailed discussion of the latch register circuits employed throughout the various figures of the drawings. A latch register is a device having two inputs, a data signal input and a latch control input. The latch register accepts information at the time the latch control signal changes from a de-energized condition to an energized condition. For this purpose the signal input must maintain its desired condition for a small interval of time immediately preceding, during and following the application of the latch control signal, this interval being measurable in terms of circuit transit times. At all other times, regardless of whether the latch control signal is energized or de-energized, the output is not controlled by the state of the data signal input which signal may be changed at will.

The latch register circuit illustrated in block form in FIG. 26 is shown in detail in FIG. 27 as including circuits 1470 through 1475 which constitute a first latch 1479 and circuits 1481 through 1485 which constitute a second latch 1480. By "latch" is meant a circuit having a control input and a data input, the output of which will follow the data input when the control input is de-energized, but the output will remain constant at the condition it had when the control changed as long as the control is energized, regardless of any changes of the input signal during this time. A latch register differs from a flip-flop in that a flip-flop is a bistable device which, when set to one state, will retain that state until set to the other state.

FIG. 27 shows a basic latch register circuit. It consists of two latch circuits connected in series; that is, the output of the first latch is connected as the input to the second latch. The latch control signals are connected in opposition; that is, when the first latch is locked, the second latch is free, and when the second latch is locked, the first latch is free.

In the illustration the AND and OR circuits are assumed to be constructed of diodes, and the level setter (LS) is made from transistors. The signal on the lower output line from the level setter 1464 has the same polarity as that of the latch control signal on the line 1462; while the polarity of the signal on the upper output line is opposite to the polarity of the signal on the input line 1462. For purposes of this description, the transit time through one level setter is considered to represent one unit of time. The transit time through the diode AND circuits and OR circuits is assumed zero. The logic is assumed to be positive.

Figure 28:
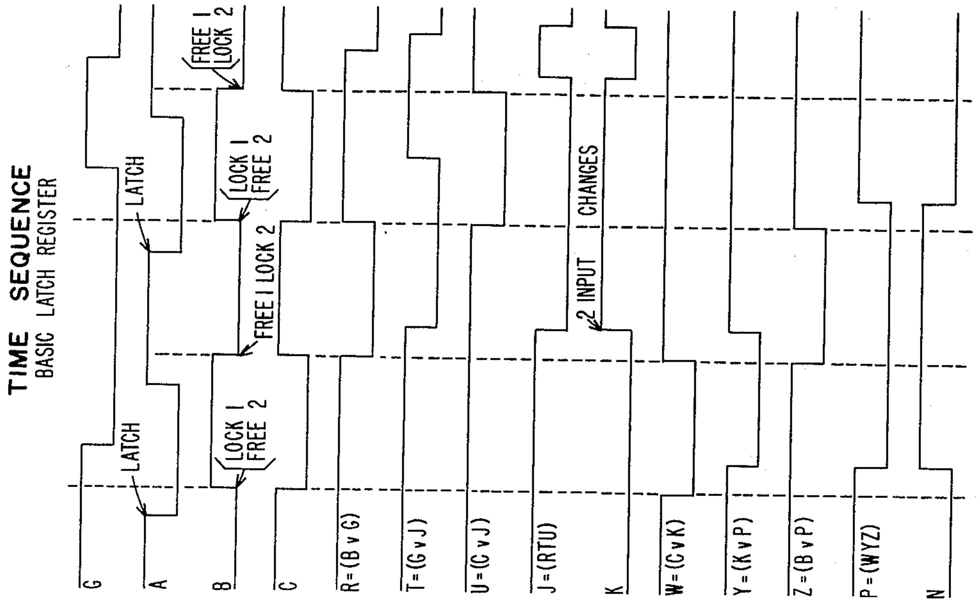
FIGURE 28 shows timing diagrams which illustrate the operation of a latch register circuit.
Figure 32:
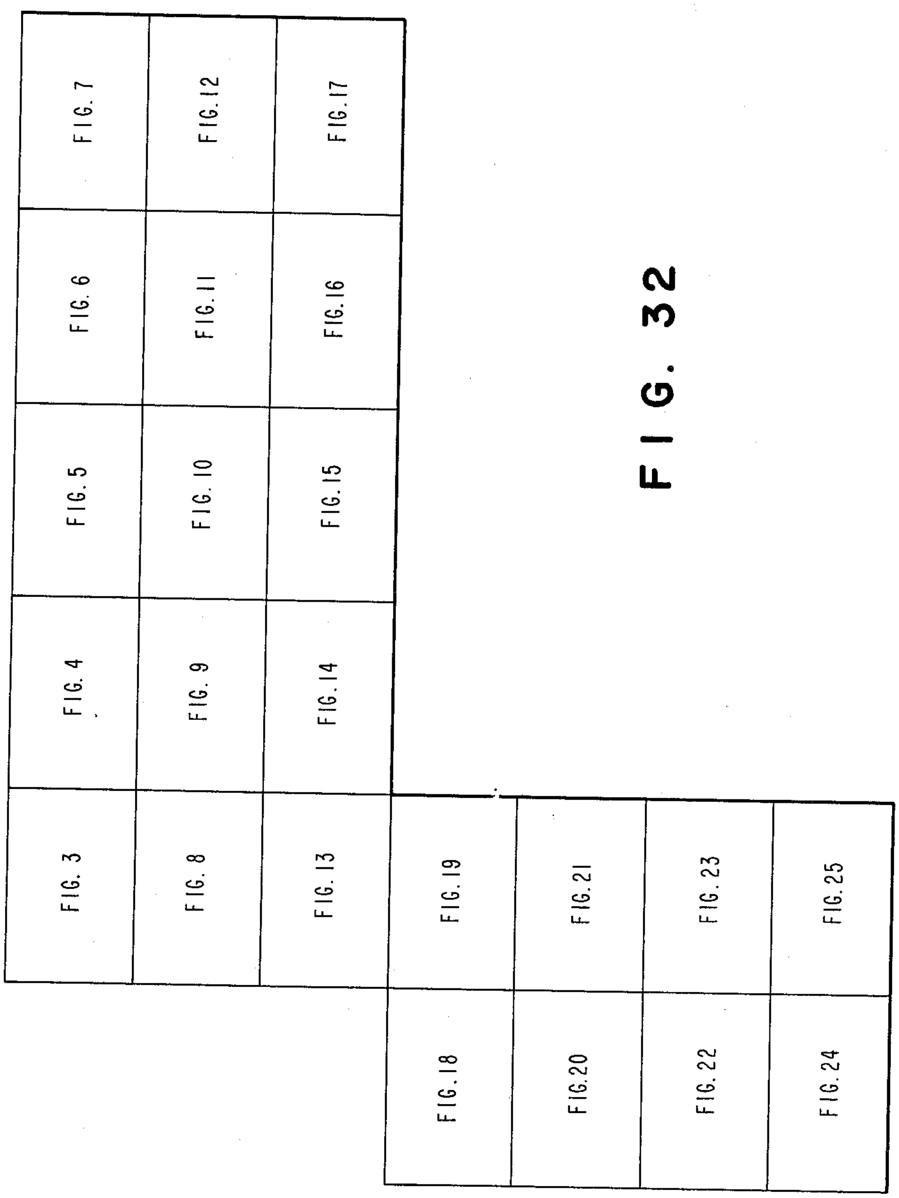
FIGURE 32 illustrates how FIGURES 3 through 25 should be arranged with respect to one another.

In order to illustrate the operation of the latch register circuit 1460 in FIG. 27, various points in the circuit are designated by different letters of the alphabet, and signals at these points change their potential in a manner indicated in FIG. 28. FIG. 28 is a timing sequence diagram illustrating how the waveforms change at various points in the circuit of FIG. 27. When the latch control signal on the line 1462 is positive, the latch 1 is free and the latch 2 is locked. The dashed arrows indicate the polarity of the signal level at the various points indicated as determined by the latch control signal at A being positive. The point C being positive causes the output of the OR circuit 1473 to be positive, thereby making U positive. This leaves points R and T to determine the condition of H. Since B is negative, R is controlled only by G, and T is positive whenever G is positive. Therefore, the potential point H will follow the potential at G and the potential at J will follow the potential at H, though the changes at J will lag one unit of time behind the corresponding change at H. When the control signal at H is negative, the latch 1 is locked and the latch 2 is free. The solid arrows indicate the polarity of the signal level at the various points indicated as determined by the control signal at A being negative. In this case the condition of the signals at points J and K will not change even though the signals at G do change. Since the signal at B is positive, the signal at R will remain positive. The signal at T will be positive if the signal at J is positive, though the signal at T will not necessarily be negative if J is negative. Since the signal at C is negative, the signal at U is controlled only by the condition of the signal at J. Therefore, if the signal at J is positive, it will be held positive by the feedback through the points U and T. If the signal at J is negative, there is no patch by which the signal G can bring the signal level at U positive.

In order to set a signal into the latch, the data signal at G must be held at its desired condition sufficiently long in advance of changing the signal at B and C for the signal at J to have acquired the same condition as the signal at G, and the signal at G must maintain this condition until the switching of the signals at B and C is completed. The latch 2 operates in the same manner as the latch 1 except that its input is the signal level at K instead of the signal level at G, and the connections of the output lines of the level setter 1470 have been reversed. Note that the signals at B and C have been inverted in latch 2 when compared to latch 1.

FIG. 28 shows a sequence time chart from which it may be seen that although the latch control signal locks latch 2 at the same time it frees latch 1, the change in the output of latch 1 does not occur until one unit of time later which allows sufficient time for the locking action of latch 2 to be completed. An overlap must be maintained here to assure reliable operation.

The use of the signal level K as an output to the latch 2 is elected to make the signal level at N, which has no other load on it, agree with the signal level at G. This also reduces the loading at J. However, if desired the signal level at J could be used as the input to the latch 2 as well as for feedback. If this were done, the signal level at P would be set to agree with the signal level at G, and P instead of N would be used as the output.

Figure 29:
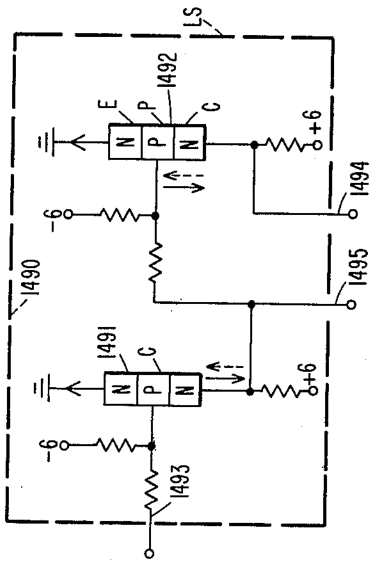
FIGURE 29 illustrates in detail a circuit diagram for the level setters illustrated in block form in FIGURE 27.

The level setters (LS) illustrated in block form in FIG. 27 may be any one of various suitable types, and one suitable arrangement is illustrated in detail in FIG. 29. The level setter 1490 in FIG. 29 includes transistors 1491 and 1492 connected as shown. When a signal is applied to an input line 1493 of one polarity, a signal of the same polarity appears on an output line 1494. The output line 1495 has a signal the polarity of which is opposite to the polarity of the signal on the output line 1494.

In operation a positive signal applied to the input line 1493 causes the transistor 1491 to conduct and the transistor 1492 to be nonconductive. Accordingly, the potential at the output line 1494 approaches a value of approximately positive 6 volts. If a signal level of approximately zero volts is applied to the input terminal 1493, the transistor 1491 becomes non-conductive and the transistor 1492 becomes conductive. Consequently, the potential at the output line 1494 approaches ground or zero level. A zero level is more negative than the positive six volt level, and the zero level is accordingly referred to as a down or negative level. The level setter 1490 serves to accept signal levels on the input line 1493 which vary within limits around plus six volts or zero volts and provides output signals on the line 1494 which are fixed in amplitude within certain precise limits. When the signal on the output line 1494 is six volts positive, a signal on the output line 1495 is approximately zero volts, and when the signal on the output line 1494 is approximately zero volts, the signal on the output line 1495 is appproximately six volts positive.

Figure 30:
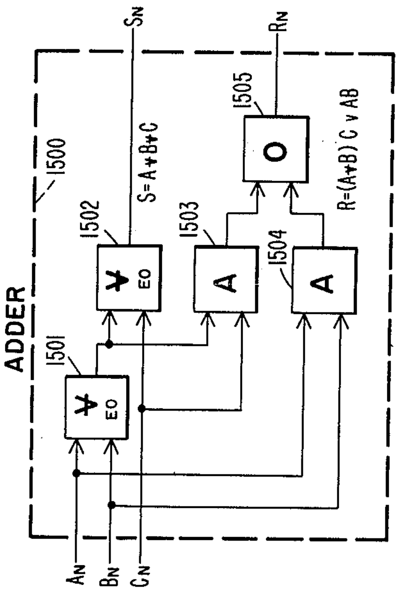
FIGURE 30 illustrates an adder circuit in logic block form.

The adder circuits employed in the adders of this divider arrangement may be any one of many suitable types, and one suitable adder circuit is illustrated in FIG. 30. It includes exclusive OR circuits 1501 and 1502, AND circuits 1503 and 1504 and an OR circuit 1505 connected as shown. Three binary inputs to the adder are labeled $A_n$, $B_n$ and $C_n$. The outputs which represent a sum and carry from the addition of the quantities $A_n$, $B_n$ and $C_n$ are designated by the letters $S_n$ and $R_n$. A positive signal on the input lines represents a binary one and a negative signal represents a binary zero. A positive signal on the output line $S_n$ represents a sum of one, and a positive signal on the output line $R_n$ represents a carry of one. Whenever $A_n$ and $B_n$ are unlike, the exclusive OR circuit 1501 supplies a positive signal to the exclusive OR circuit 1502. Whenever the signal supplied by the exclusive OR circuit 1501 to the exclusive OR circuit 1502 is unlike $C_n$, a positive signal is supplied on the output line $S_n$ which represents a binary sum of one. For all other conditions the output line $S_n$ is a negative signal representing a binary sum of zero. The exclusive OR circuit 1501 supplies a signal to the AND circuit 1503. Whenever both of these lines are positive, the AND circuit 1503 provides a positive signal through the OR circuit 1505 to the output line $R_n$. A positive signal on the line $R_n$ represents a carry of one. The lines $A_n$ and $B_n$ are connected to the AND circuit 1504 which in turn is connected through the OR circuit 1505 to the output line $R_n$. When both $A_n$ and $B_n$ are positive, the output line $R_n$ is rendered positive, thereby indicating a carry of one. When neither the AND circuits 1503 nor 1504 provides a positive signal to the OR circuit 1505, a negative signal appears on the output line $R_n$ representing a carry of zero. Accordingly, the adder circuit 1500 responds to signals on the input lines $A_n$, $B_n$ and $C_n$ and provides signals on the output lines $S_n$ and $R_n$ representative of the sum and carry, respectively. The adder 1500 in FIG. 30 is employed in each adder stage of the adder 46 in FIGS. 20 and 21 and the adder 142 in FIG. 25.

Whenever all of the stages 1 through 5 of the shift counter register 126 in FIG. 24 hold zeros, negative signals are supplied on all of the output lines to an OR circuit 1330, and its output is a negative signal which is inverted by an inverter 1331 the positive output of which is applied to an AND circuit 1334. The AND circuit 1334 has a second input from an inverter circuit 1336 the input of which is supplied with signals on the line 74 representative of the sign of the remainder. A negative signal level on the line 74 represents a binary zero which indicates a plus sign. A positive signal level on the line 74 represents a binary one, and it signifies a minus sign. When the output from the AND circuit 1334 is a positive signal level, this signifies that the division problem is completed because there are no further shifts to be made as indicated by the shift count register 126 in FIG. 24, and the sign of the remainder in stage 1 of the dividend register 10 in FIG. 3 is a plus sign represented by a negative signal level on the line 74 which is inverted to a positive level by the inverter 1336 in FIG. 25. The positive output signal from the AND circuit 1334, signifying completion of the division problem, may be used to inhibit the application of further positive pulses to the latch control line 970 in FIG. 3.

If the remainder is in complement form, as signified by a positive signal level on the line 74, and no more shifts are to be performed, as signified by all stages of the shift count register 126 in FIG. 24 having zeros, an AND circuit 1336 in FIG. 25 receives two positive signals and provides a positive output signal. A positive output signal from this AND circuit indicates that no further shifts are to be performed, but another add cycle is required to change the complement remainder to a true remainder. In this case the positive output signal from the AND circuit 1336 is inverted to a negative signal level by an inverter 1337, and this negative level is applied to a gate 1338, thereby deconditioning the gate 1338 and causing it to supply a negative signal representative of binary zero on its output line 109 to the low order quotient bit in stage 32 of the dividend register 10 in FIG. 7. It is necessary to decondition the gate 1338 because the addition of the complement remainder and the true divisor in the adder 46 in FIGS. 19 and 21 cause the output from the adder stage 1 to be a negative signal representative of binary zero which is inverted by the inverter 1097 in FIG. 21 and applied as a positive level to condition a gate 1340 in FIG. 23. Since this gate may pass a positive signal through an OR circuit 1342 to the gates 1338, it is necessary to supply a negative signal from the inverter 1337 to the gate 1338 to insure that a positive signal is not established on its output line 109 representative of a binary one.

Whenever the number of shifts requested by the decoding operations in the AND circuits 1121 through 1126 is greater than the number of shifts available as indicated in the shift counter register 126 in FIG. 24, the output line 144 from the high order stage of the adder 142 in FIG. 25 has a negative signal level which is applied to an OR circuit 1350, the output of which is inverted by an inverter circuit 1352 and applied through an OR circuit 1354 is a positive level to condition a gate 1356. The gate 1356 passes positive signal levels on the line 1358, representative of binary ones, through the OR circuit 1342 to the gate 1338. A positive signal from the gate 1338 is applied to the output line 109, and this signal level represents the lowest order quotient bit which is stored in position 32 of the dividend register 10 in FIG. 7. It is pointed out that signals on the line 1358 are representative of binary ones or zeros which are being skipped. A positive signal level from the OR circuit 1354 is applied also to an inverter 1360 which converts the positive level to a negative level and supplies it to the gate 1340, thereby deconditioning this gate. The gate 1340 normally is used to generate the lowest order quotient bit by sampling the output of the adder stage 1 of the adder 46 in FIG. 20, but it is deconditioned by the positive signal level from the OR circuit 1354 at the same time that the gate 1356 is conditioned by the signal level. Whenever a shift of greater than 5 is decoded by the AND circuit 1126 in FIG. 22, the output of this AND circuit is a positive level which is applied to the OR circuit 1354 in FIG. 23; this signal level conditions the gate 1356 and deconditions the gate 1340; and the proper quotient bit is generated by sampling the output of the third stage in the dividend register 10 instead of sampling the output of the adder stage 1 of the adder 46 in FIG. 20. The output level on the line 1358 from the gate 1356 represents the bits being skipped over, i.e., ones or zeros.

Figure 4:
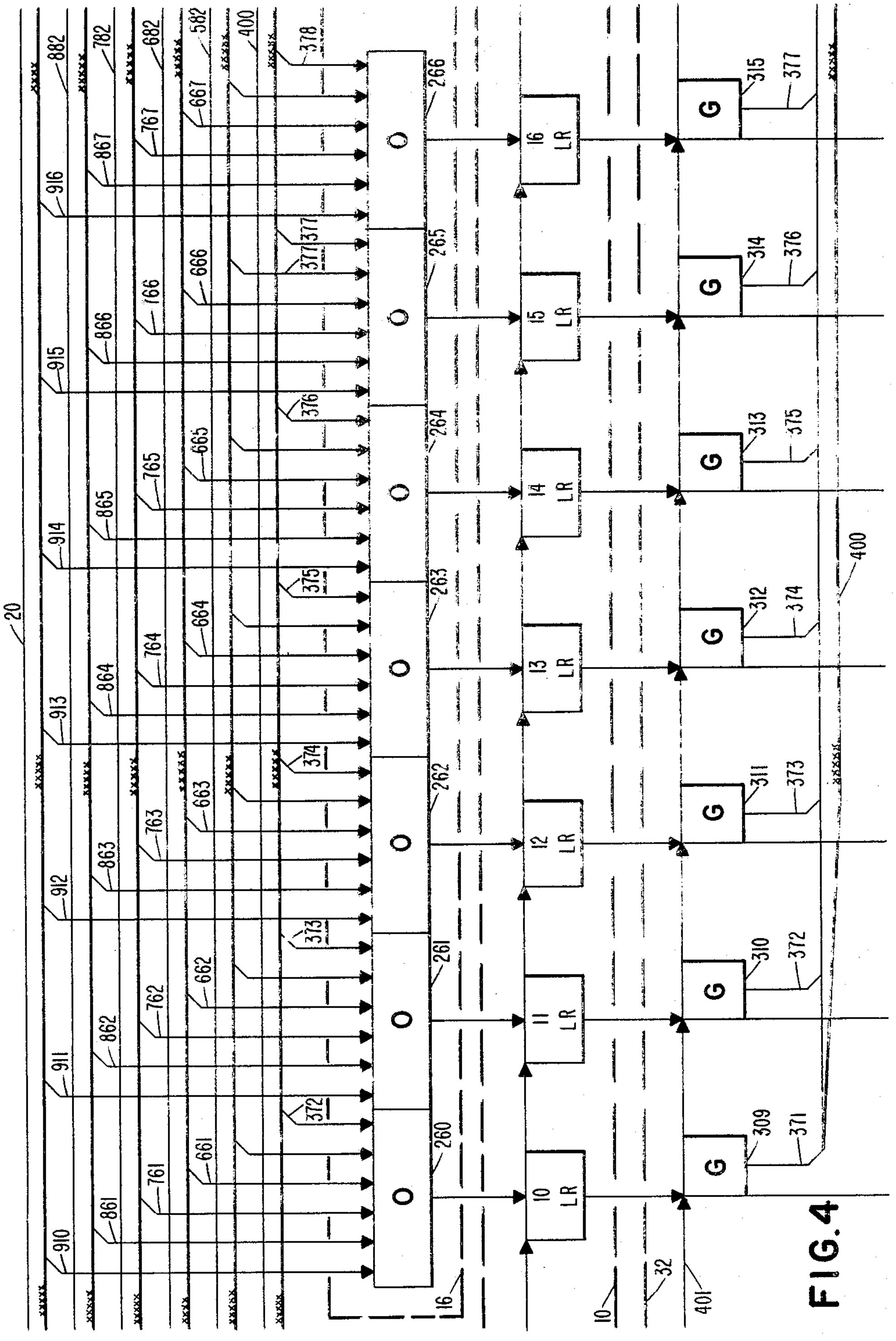
Figure 5:
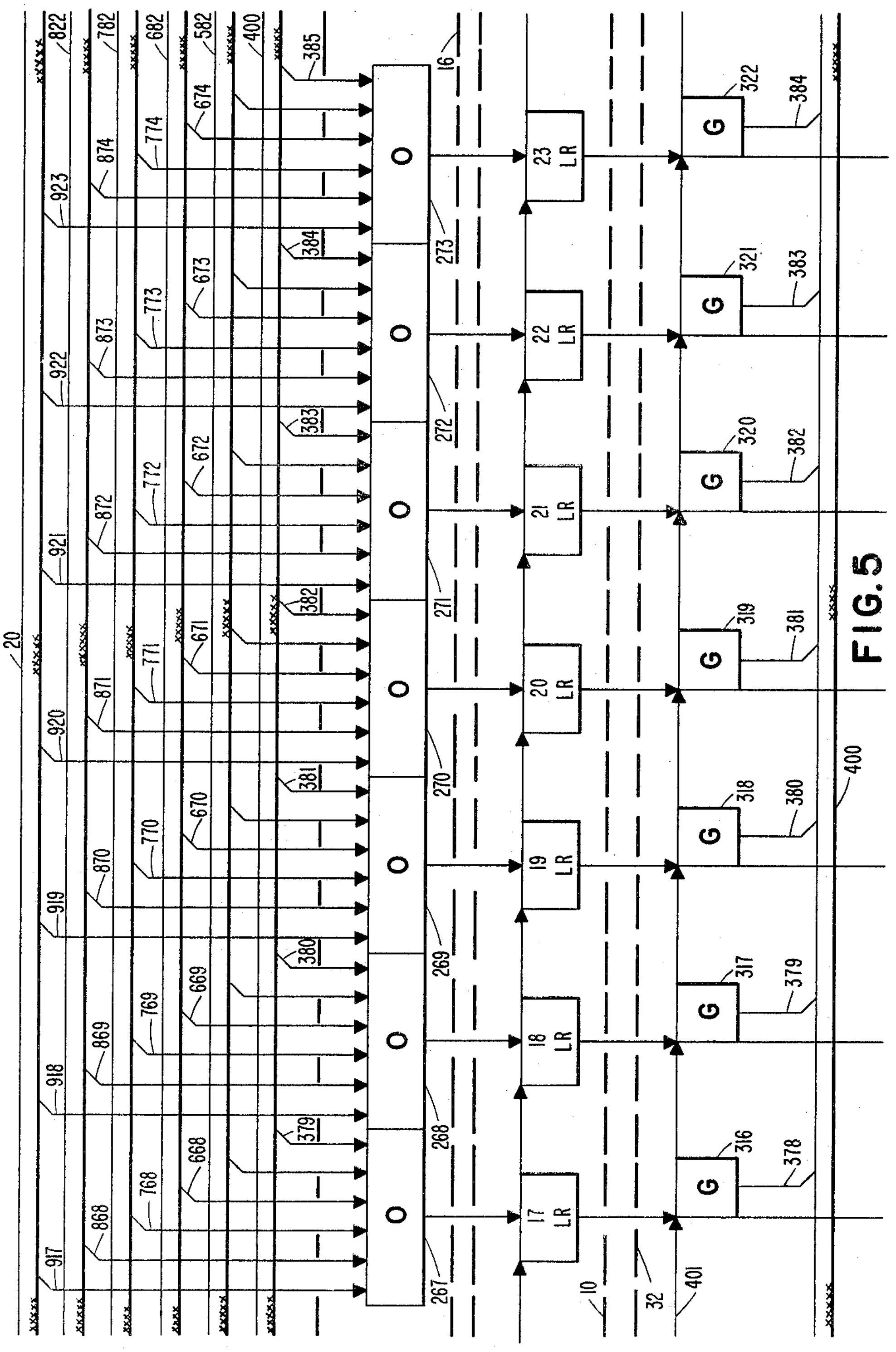
Figure 6:
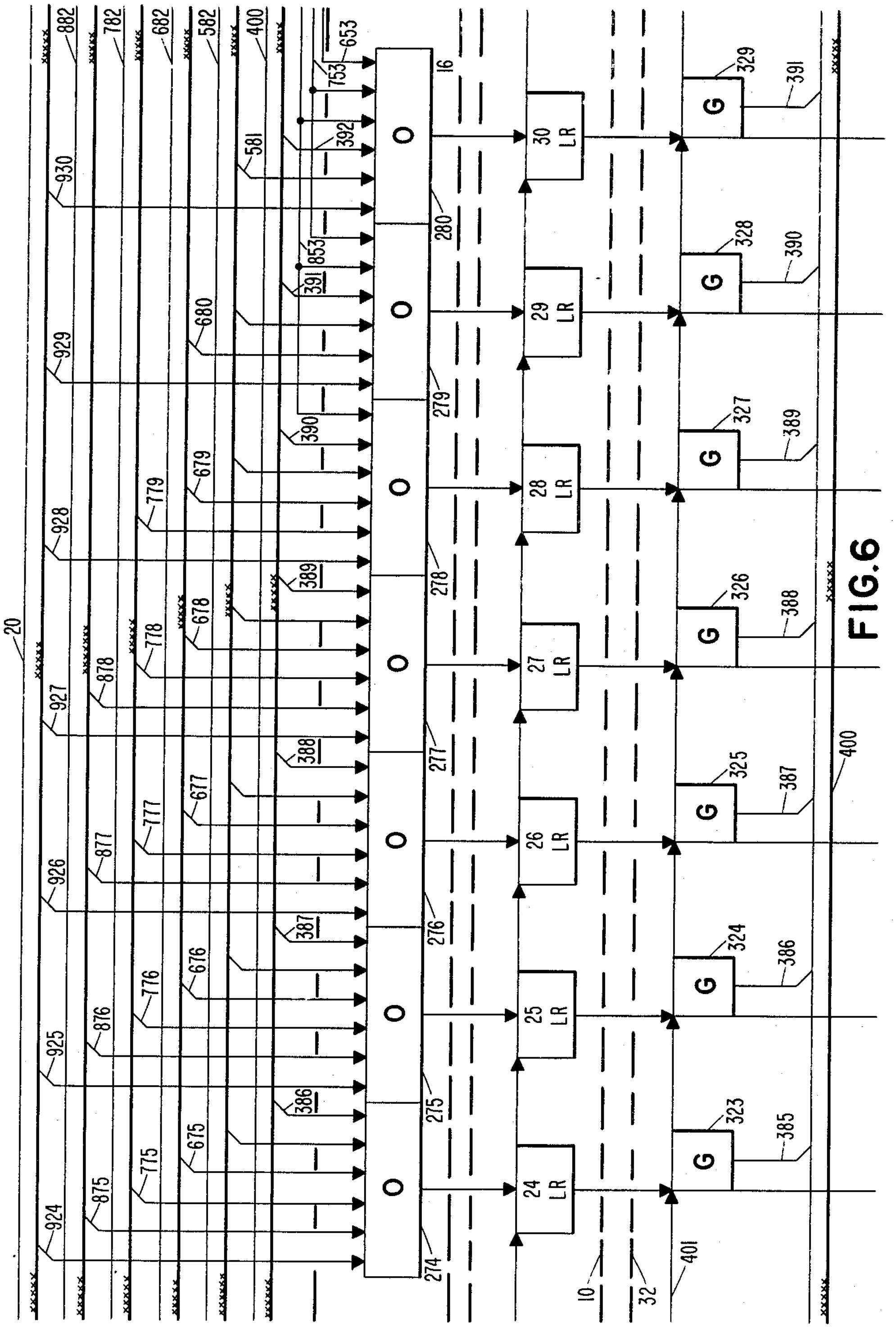

The gates 152 in FIG. 25 are conditioned by a positive signal level from an AND circuit 1362 during a divide operation, and these AND circuits convey the output of the adder 142 to the shift count register 126 in FIG. 24 as long as the AND circuit 1362 provides a positive output level. The AND circuit 1362 has an output line 1364 which is supplied with a poistive level during a divide operation, and it has a line 144 coupled thereto from the high order adder stage of the adder 142. The line 144 has a positive signal level thereon whenever the shifts available as indicated in the shift count register 126 in FIG. 24 exceeds the shifts requested as indicated by the decoding operation in the AND circuits 1121 through 1126 in FIG. 22. Accordingly, the outputs of the adder circuits 1 through 5 of the adder 142 in FIG. 25 represent a number which is successively decreased from cycle to cycle, and this decreased number is stored during each cycle in the shift count register 126. When the number represented in the shift count register 126 becomes less than the number of shifts requested by the decoding operation in the AND circuits 1121 through 1126, the divide operation is nearing the end. Accordingly, the output line 144 from the high order stage of the adder 142 of FIG. 25 changes from a positive level to a negative level, and this deconditions the AND circuit 1362, thereby deconditioning the set of gates 152 in FIG. 25 and causing zeros to be supplied to the shift count register 126 in FIG. 24. At the same time the shifts available in the shift count register 126 are decoded by the AND circuits 1251 to 1256, and this number of shifts is selected for the next add or partial dividend operation by the positive signal level from the inverter 1270 in FIG. 24. This terminates the divide operation with the generation of the proper number of quotient bits as determined by the number represented in the shift count register 126 in FIG. 24. One more cycle may be required to change a negative remainder to a positive remainder in which case the shift count register 126 supplies zeros to the AND circuits 1251 through 1256 which causes a shift of zero to be selected whereby the remainder in stages 1 through 8 of the dividend register 10 in FIG. 3 is supplied to the adder 46 in FIGS. 20 and 21; the result of the addition is returned as an input to the first eight stages of the dividend register 10 in FIG. 3; the outputs of the shift counter register 126 in FIG. 4 are supplied to the OR circuit 1330 in FIG. 25 as negative levels; the negative output of the OR circuit 1330 is inverted to a positive level by the inverter circuit 1331 and applied to the AND circuit 1336 at the same time that a positive level is supplied to this AND circuit on the line 74; and the output of the AND circuit 1336 is a positive level which is converted to a negative level in the inverter circuit 1337 and applied to the gate 1338 to decondition it and prevent generation of a quotient bit representative of binary one. However, any quotient bit represented by a signal on the line 109 is not stored in the position 32 of the shift register 10 in FIG. 7 during a cycle when the remainder is corrected from a negative to a positive remainder because a positive signal applied to the latch control line 970 in FIG. 3 during such a cycle is stopped by the gate 974, which is deconditioned during such a cycle because a shift of zero is selected, and not applied to stages 10 through 32 of the shift register 10 in FIGS. 3 through 7. Accordingly, it is seen that any quotient bit generated at this time on the line 109 from the gate 1338 in FIG. 23 is not stored in position 32 of the dividend register 10 of FIG. 7.

Figure 23:
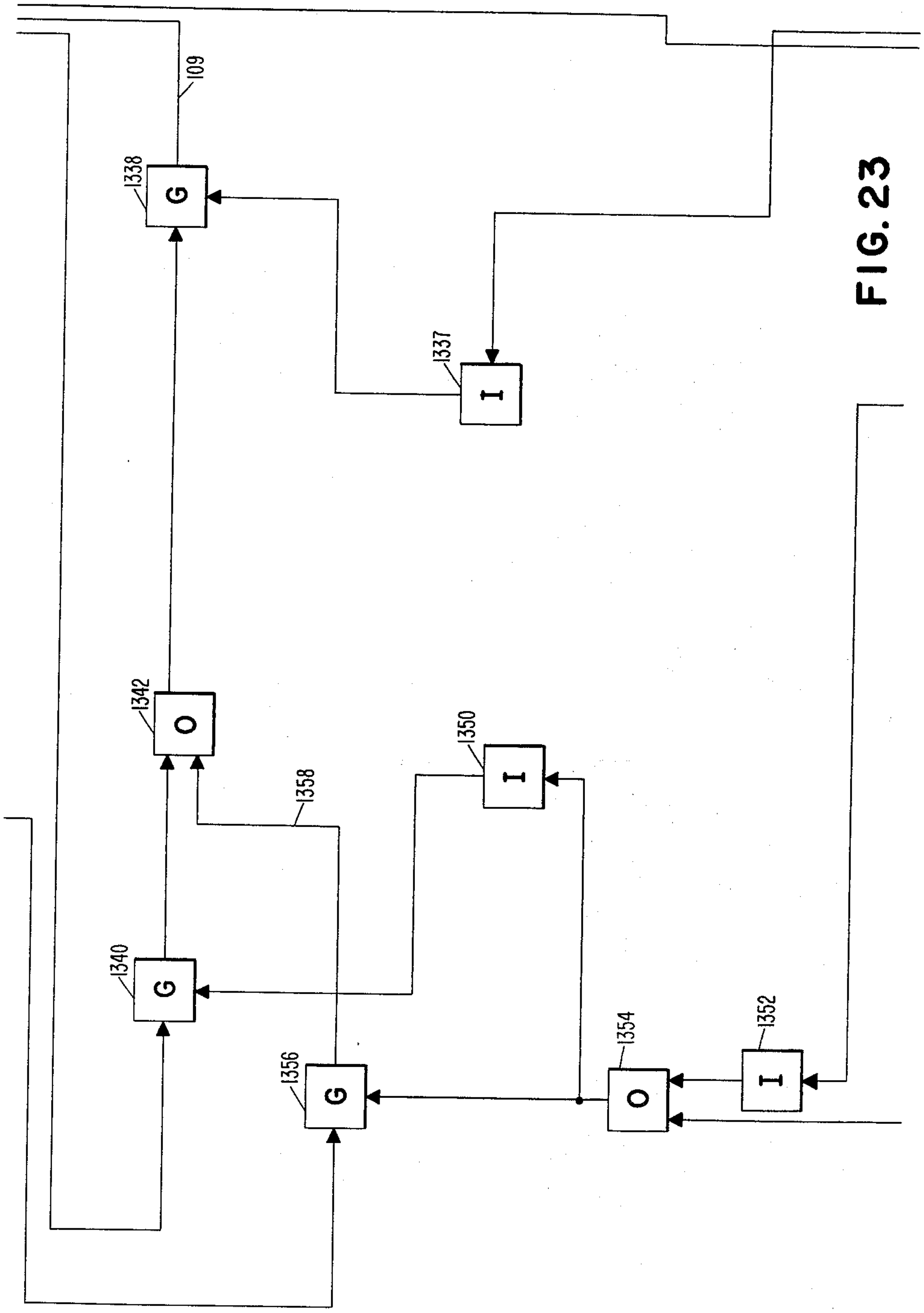

Whenever a divide operation is performed, the first cycle involves a shift of zero, an add operation in the adder 46 in FIGS. 20 and 21 and the generation of a single quotient bit from the gate 1338 in FIG. 23. These operations are performed in the manner previously explained. During the second and subsequent cycles, a series of ones or a series of zeros in the dividend are skipped, and the number of such ones or zeros is determined in the preceding cycle by the decoding function of the AND circuits 1121 through 1126 in FIG. 22, there being a minimum shift of one position for each add operation as long as the number of shifts requested by the decoding operation in the AND circuits 1121 through 1126 is less than the number of shifts available as represented in the shift count register 126 in FIG. 24. The second and subsequent cycles involve the insertion of quotient bits in the low order positions of the dividend register in FIGS. 6 and 7 for each one or zero in the string skipped except the last one, and the proper quotient bit for the last one or zero in a string is determined by the output of the adder stage 1 which quotient bit is represented by a signal established on the line 109 in FIG. 23 in the manner previously explained. The second and subsequent cycles continue in this fashion until the number of shifts requested by the decoding operation in the AND circuits 1121 through 1126 in FIG. 22 exceeds the number of shifts represented in the shift count register 126 in FIG. 4. In this event the number of shifts represented in the shift counter register 126 is decoded in the AND circuits 1251 through 1256, and the number thus selected is the number of shifts used in the next cycle. The next cycle is the last cycle if the remainder resulting therefrom is a positive remainder as represented by a binary zero in the sign position of the remainder. In case the remainder has a negative sign, one additional cycle is required to convert the negative remainder to a positive remainder in which event a shift of zero is selected and no new quotient bit is stored in position 32 of the dividend register 10 in FIG. 7.

The second and subsequent add cycles of a divide problem are continued until a termination condition is indicated. A termination condition is indicated whenever the shifts requested by the decoding operation in the AND circuit 1121 through 1126 in FIG. 22 is equal to the number of shifts available in the shift counter 126 of FIG. 24 or a termination condition is indicated whenever the number of shifts indicated in the shift counter 126, FIG. 24, is less than the number of shifts requested by the decoding operation in the AND circuits 1121 through 1126, FIG. 22. Whenever the number of shifts requested exceeds the number of shifts available, at least one more add cycle is required to complete the divide problem. In this event the sign of the dividend is examined, and if the sign is plus, the next cycle involves a shift operation, the insertion of quotient bits identical to the bits skipped, no add operation being involved. Such a cycle is indicated by the output of the OR circuit 1350 being a negative level which operates the gate 1356 in FIG. 23 to pass a positive signal in case binary ones are being skipped or a negative signal in case binary zeros are being skipped. The signal thus passed is applied through the gate 1338 and on the line 109 to the low order position 32 of the dividend register 10 in FIG. 7. The remaining low order quotient bits for any or all of the positions 28 through 31 of the dividend register 10 in FIGS. 6 and 7 may be generated on associated lines 553, 653, or 853, as the case may be. This terminates the divide operation. In case the sign of the dividend is minus, the next cycle involves a shift operation, an add operation in the adder 46 in FIGS. 20 and 21, and the generation of the proper quotient bits with the lowest order quotient bit being determined by the output of the adder stage 1 as it affects the output of the gate 1338 in FIG. 23 as earlier explained. This terminates the divide operation. In either of the foregoing cases, it is seen that the divide operation is terminated in one more cycle when the specified conditions are determined.

In the event a termination operation is signified by the shifts requested being equal to the number of shifts available, at least one more cycle is required which involves a shift operation, an addition operation in the adder 46, FIGS. 20 and 21, the generation of the proper number of quotient bits with the lowest quotient bit being determined by the output of the adder stage 1 of the adder 46 as this output affects the gate 1338 in FIG. 23. The completion of this cycle terminates the divide problem if the remainder is in true form. In case the remainder is in complement form, one more cycle is required which involves no shifts, an addition operation in the adder 46 in FIGS. 20 and 21 for the purpose of converting the negative remainder to a positive remainder, but no additional quotient bits are generated and stored in the low order positions of the dividend register 10 in FIGS. 6 and 7. The termination of this cycle terminates the divide problem. It is seen therefore that when a termination operation is signified, the divide problem is terminated on the subsequent cycle in three out of the four possibilities considered above, and the divide problem is terminated in the fourth possibility considered above by the use of a still further cycle.

Figure 33:
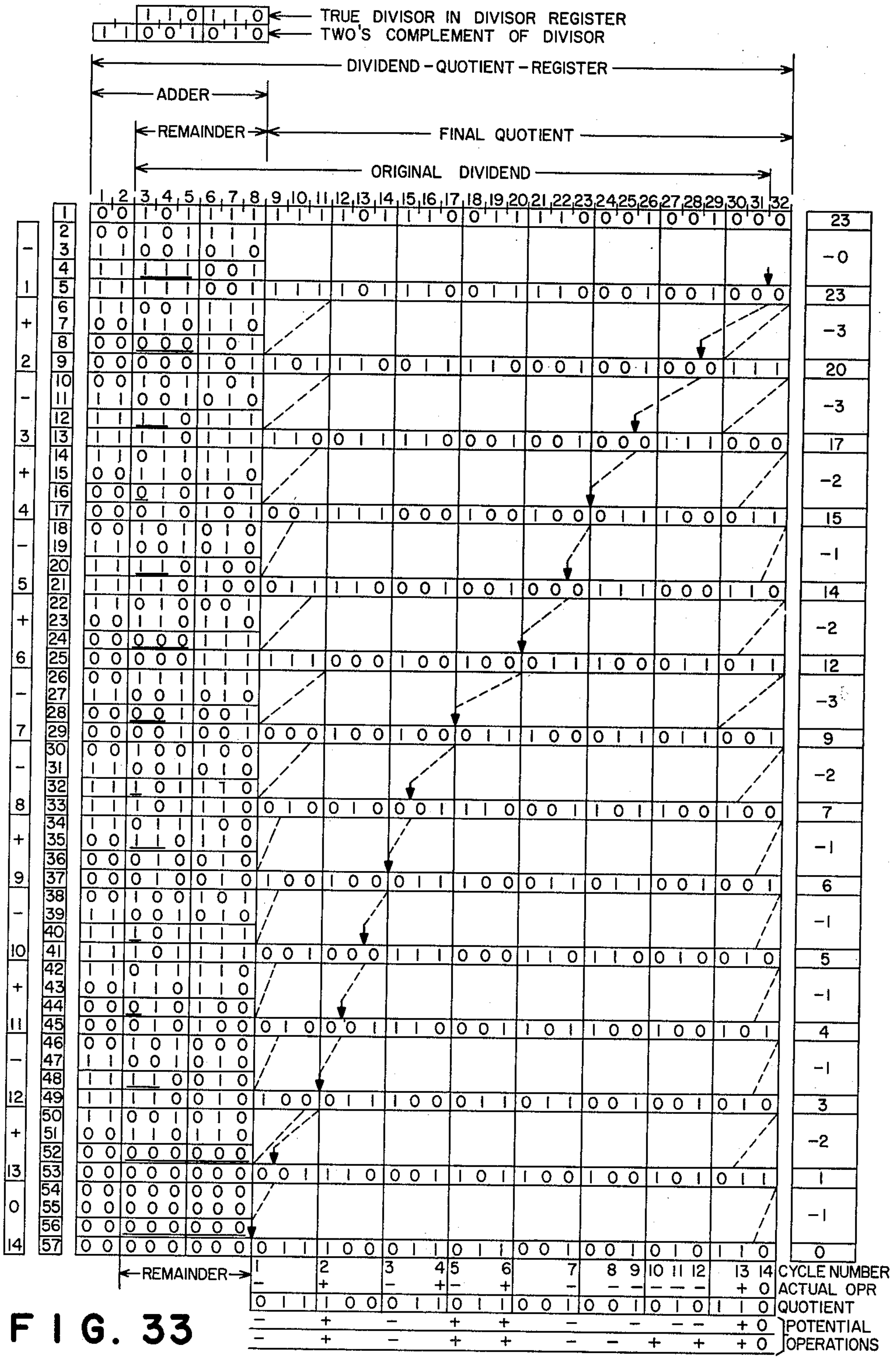
FIGURE 33 is a chart which illustrates the operations which take place in the various parts of a divider according to this invention.

For the purpose of illustrating how a division problem is solved according to this invention, reference is made to FIG. 33 which shows a divisor as a true number in binary form as 110110 and a dividend as a true number in binary form as 00101111111101110011110001001000. The bits of the divisor taken from left to right are disposed in respective stages 1 through 6 of the divisor register 62 in FIG. 19. The bits of the dividend taken from left to right are disposed in the stages 1 through 32 of the dividend register 10 in FIGS. 3 through 7. In FIG. 33 the divisor is shown at the top, and the initial dividend is shown in columns 3 through 31 of row 1. The leftmost column in FIG. 33 contains two items of information about each added operation or partial dividend. A plus or minus sign indicates whether a respective addition or subtraction is being performed. The numbers in the leftmost column of FIG. 33 are sequence numbers which indicate how many add operations or partial dividends have been performed. It is pointed out that the complete divide operation requires fourteen add cycles. The rightmost column of FIG. 33 shows the shift counter operation. The number 23 in the rightmost column of row 1 represents the initial setting of the shift counter register 126 in FIG. 24. The —0 disposed below the number 23 in the upper corner of the rightmost column of FIG. 33 indicates that there are no shifts of the dividend during the first add operation or partial dividend. A running account of the shift count register operation is readily determined from the remaining portion of the rightmost column in FIG. 33 for each add operation. It should be noted that following the cycle 13, the shift decoder 110 in FIGS. 22 and 24 indicates six leading zeros, but the shift count register 126 in FIG. 24 has an output indicating one so that the shift actually used is one.

The second column from the left in FIG. 33 has row numbers. Row 1 indicates the original dividend. Row 2 indicates that portion of the original dividend which is transferred to the adder 46 in FIGS. 20 and 21. Row 3 indicates the bits of the divisor which are supplied from the AND circuits 70 in FIG. 21 to the adder 46 in FIGS. 20 and 21. Row 4 indicates the output from the adder 46 in FIGS. 20 and 21, and this number is supplied to the decoder 110 in FIGS. 22 and 24 and to positions 1 through 8 of the dividend register 10 in FIG. 3 where this information is stored when the next latch control signal is applied to the line 970 in FIG. 3. Note that the information in row 4 appears in row 5 in columns 1 through 8. A latch control signal on the line 970 in FIG. 3 stores the result from the adder 46 in FIGS. 20 and 21 in positions 1 through 8 of the dividend register 10 of FIG. 3, and the first quotient bit generated on the line 109 in FIG. 23 is stored at the same time in position 32 of the dividend register 10 in FIG. 7. This latch control signal on the line 970 in FIG. 3 terminates the first add operation or first partial dividend shown in rows 1 through 4 and initiates the second add operation or partial dividend shown in rows 5 through 8. Columns 1 and 2 of FIG. 33 serve as sign indicators. The information in row 4 of columns 3 through 5 are all binary ones, and these binary ones cause the decoder 110 in FIGS. 22 and 24 to select a shift of three for the second partial dividend or add operation. This shift of three positions during the second add operation is indicated by the dotted line with an arrowhead in the upper righthand portion of FIG. 33. A similar dotted line arrowhead arrangement is used for each add operation to signify the number of positions shifted, and it can be seen from these dotted lines how the original dividend is progressively shifted to the left during a divide problem. When fourteen add operations or partial dividends are completed, the original dividend is gone as may be readily seen by observing row 57 in FIG. 33. The quotient appears in columns 9 through 32 of row 57, and the remainder appears in columns 3 through 8 of row 57. It is seen, therefore, how the circuits of FIGS. 3 through 25 are operated to generate a quotient of twenty-three binary bits in fourteen add operations by skipping over strings of ones and zeros, inserting the bits skipped over as quotient bits and performing an add operation to determine whether the last bit in a string of ones or zeros must be modified as a quotient bit.

While the invention has been particularly shown and described with reference to a preferred embodiment thereof, it will be understood by those skilled in the art that various changes in form and details may be made therein without departing from the spirit and scope of the invention.

What is claimed is:

1. A binary divider including a dividend storage device, a shifter coupled to the dividend storage device, a divisor storage device, an adder coupled to the dividend storage device and the divisor storage device, a decoder coupled to the adder for determining the number of ones or zeros in a string, the decoder being coupled to the shifter to control the number of shifts made by the shifter, a quotient generator device coupled to the adder and the dividend storage device for generating multiple quotient bits, whereby a quotient is generated by skipping over strings of ones or zeros.

2. The apparatus of claim 1 wherein the quotient generator device inserts the string of ones or zeros in the dividend or partial dividend in the quotient except for the last bit in the string which is determined by an overflow signal from the adder.

3. An arithmetic device for performing division with binary numbers including a dividend register to store signals representing a dividend, a divisor register to store signals representing a divisor, an adder having an output and two inputs, one input being taken from the dividend register and the other input being taken from the divisor register, a decoder having an input coupled to the output of the adder for determining the number of ones or zeros in a string, a shifter coupled to the dividend register for shifting information held in the dividend register, the decoder having output means coupled to the shifter for controlling the shifter, means coupled to the dividend register and the adder for generating multiple quotient bits for a string of ones or zeros.

4. The apparatus of claim 3 wherein the last means includes a circuit arrangement for transferring all bits of ones or zeros in a string except the last bit directly as quotient bits, and the last quotient bit is determined by an overflow signal from the adder.

5. A divider circuit including a dividend register for storing signals representing a dividend or a partial dividend having a plurality of orders, a divisor register for storing signals representing a divisor having a plurality of orders, an arithmetic device coupled to the dividend register and the divisor register, said arithmetic device being operated in successive cycles for finding the difference between the dividend and the divisor during each cycle, said divider circuit including means to shift the content of the dividend register as many orders as there are successive zeros or radix-minus-one digits in a string in the partial dividend and to provide N quotient digits whenever a string of N successive zeros or radix-minus-one digits are in the high orders of the partial dividend, where N is any integer equal to or greater than two.

6. A divider including a dividend register for storing signals representing a dividend or a partial dividend having a plurality of orders, a divisor register for storing signals representing a divisor having a plurality of orders, an arithmetic device coupled to the dividend register and the divisor register, said arithmetic device being operated in successive cycles for finding the difference between the dividend and the divisor during each cycle, shift means coupled to the dividend register for selectively shifting the content thereof, said divider including further means to operate said shift means to shift the content of the dividend register as many orders as there are successive zeros or radix-minus-one digits in a string in the partial dividend and provide N quotient digits whenever a string of N successive zeros or radix-minus-one digits are in the high orders of the dividend register, where N is any integer equal to or greater than two.

7. A divider including a dividend register for storing signals representing a dividend or a partial dividend having a plurality of orders, a divisor register for storing signals representing a divisor having a plurality of orders, an arithmetic device coupled to the dividend register and the divisor register, said arithmetic device being operated in successive cycles for finding the difference between the dividend and the divisor during each cycle, shift means coupled to the dividend register for selectively shifting the content thereof, said divider having further means including a decoder coupled to said shift means to operate said shift means to shift the content of the dividend register as many orders as there are successive zeros or radix-minus-one digits in a string in the partial dividend, and a quotient generator including a first circuit coupled to the high orders of the dividend register for providing N−1 quotient digits whenever a string of N successive zeros or radix-minus-one digits are in the high orders of the partial dividend, where N is any integer equal to or greater than two, and a second circuit responsive to the result in the arithmetic device for providing the quotient digit for the last and lowest order digit in said string.

8. A divider including a dividend register for storing signals representing a dividend or a partial dividend having a plurality of orders, a divisor register for storing signals representing a divisor having a plurality of orders, an arithmetic device coupled to the dividend register and the divisor register, said arithmetic device being operated in successive cycles for finding the difference between the dividend and the divisor during each cycle, a decoder coupled to receive signals from the highest orders of the arithmetic device in a given cycle for determining N successive zeros or radix-minus-one digits in a string in a partial divided, where N is any integer equal to or greater than two, shift means coupled to the dividend register for selectively shifting the content thereof, said decoder being coupled to said shift means to control said shift means in the cycle next following said given cycle to shift the content of the dividend register as many orders as there are successive zeros or radix-minus-one digits in a string in the partial dividend, means coupled to the high orders of the dividend register for providing N−1 quotient digits whenever a string of N successive zeros or radix-minus-one digits are in the high orders of the dividend register and means responsive to the result in the arithmetic device for providing the quotient digit for the last and lowest order digit in said string.

9. A divider including a dividend register for storing signals representing a dividend or a partial dividend having a plurality of orders, a divisor register for storing signals representing a divisor having a plurality of orders, an arithmetic device coupled to the dividend register and the divisor register, said arithmetic device being operated in successive cycles for finding the difference between the dividend and the divisor during each cycle, a decoder coupled to receive signals supplied from the highest orders of the arithmetic device for determining N successive zeros or radix-minus-one digits in a series in a partial dividend, where N is any integer equal to or gerater than two, shift means coupled ot the dividend register for selectively shifting the content thereof, said decoder being coupled to said shift means to control said shift means to shift the content of the dividend register as many orders as there are successive zeros or radix-minus-one digits in a series in the partial dividend, means coupled to the high orders of the dividend register for providing N−1 quotient digits whenever a series of N successive zeros or radix-minus-one digits are in the high orders of a partial dividend and means responsive to the result in arithmetic device for determining the quotient digit for the last and lowest order digit in said series.

10. A divider circuit for skipping over a series of zeros or radix-minus-one digits in a partial dividend when developing a quotient, said divider circuit including a partial dividend storage means, a divisor storage means, and an arithmetic device coupled to the partial dividend storage means and the divisor storage means, said divider circuit further including means to provide a plurality of quotient orders whenever a series of zeros or radix-minus-one digits are disposed in the highest orders of a partial dividend.

11. A divider circuit for skipping over a string of zeros or radix-minus-one digits in the remainder or partial dividend when developing a quotient, said divider circuit including a dividend storage means, a divisor storage means, and an arithmetic device coupled to the dividend storage means and the divisor storage means, said arithmetic device being operated in successive cycles to find the difference between the remainder and the divisor during each cycle, said divider circuit further including means to provide a plurality of quotient orders in one cycle of operation of said arithmetic device whenever a string of zeros or radix-minus-one digits are disposed in the highest orders of the remainder or partial dividend.

12. A binary divider circuit including a dividend storage register, a divisor storage register, an arithmetic circuit coupled to the dividend storage register and the divisor storage register, said binary divider circuit having means to determine N−1 quotient bits simultaneously whenever a series of N zeros or N ones are present in a partial dividend, where N is an integer equal to or greater than two.

13. A binary divider circuit including a dividend storage register, a divisor storage register, an arithmetic circuit coupled to the dividend storage register and the divisor storage register, said arithmetic device being operated in successive cycles to find the difference between the dividend and the divisor during each cycle, said binary divider circuit having means to provide a plurality of quotient bits during one cycle of operation of said arithmetic device whenever a series of zeros or ones are disposed in the highest order bits of a partial dividend.

14. A divider circuit including first storage means for storing signals representative of a partial dividend, second storage means for storing signals representative of a divisor, an arithmetic device coupled to said first and second storage means for determining the difference between dividend and the divisor, said divider circuit including means for skipping over a series of zeros or radix-minus-one digits in a partial dividend and for providing a pluraltiy of quotient digits for the series of zeros or radix-minus-one digits skipped over.

15. The apparatus of claim 14 wherein the last means includes further means which inserts in the quotient values identical to the string of zeros or radix-minus-one digits skipped over in the partial dividend except the last digit in the string for which a quotient digit is determined by still another means responsive to the result from said arithmetic device.

References Cited in the file of this patent

UNITED STATES PATENTS 2,924,383 Weiss ------------------ Feb. 9, 1960